(12) United States Patent
Detweiler et al.

(10) Patent No.: US 11,988,159 B2
(45) Date of Patent: May 21, 2024

(54) ELECTRIC MACHINE POWER ASSIST OF TURBINE ENGINE DURING IDLE OPERATION

(71) Applicant: General Electric Company, Schenectady, NY (US)

(72) Inventors: Gregory L. Detweiler, Cincinnati, OH (US); Thomas William Brown, Cincinnati, OH (US); Robert Charles Hon, Walton, KY (US); Alan Gregory Murphy, Apple Valley, CA (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 17/380,524

(22) Filed: Jul. 20, 2021

(65) Prior Publication Data
US 2023/0021937 A1 Jan. 26, 2023

(51) Int. Cl.
*F02C 9/48* (2006.01)

(52) U.S. Cl.
CPC .......... *F02C 9/48* (2013.01); *F05D 2220/323* (2013.01); *F05D 2270/053* (2013.01)

(58) Field of Classification Search
None
See application file for complete search history.

(56) References Cited

U.S. PATENT DOCUMENTS

| | | |
|---|---|---|
| 8,360,360 B2 | 1/2013 | Cros et al. |
| 8,474,749 B2 | 7/2013 | Cros et al. |
| 9,013,330 B2 | 4/2015 | Nutaro et al. |
| 10,336,461 B2 | 7/2019 | Mackin |
| 10,569,759 B2 | 2/2020 | Gansler et al. |
| 11,548,651 B2 | 1/2023 | Terwilliger |
| 2017/0211477 A1* | 7/2017 | Menheere .................. F02C 7/32 |
| 2018/0022464 A1* | 1/2018 | Gelwan .................... F01D 13/00 701/100 |
| 2018/0194483 A1 | 7/2018 | Schwoller |
| 2018/0216526 A1* | 8/2018 | Dalal ........................ F02C 7/32 |
| 2018/0273211 A1* | 9/2018 | Chang ..................... H02M 7/44 |
| 2019/0002116 A1* | 1/2019 | Gansler .................... F01D 11/20 |
| 2020/0055610 A1* | 2/2020 | Terwilliger ............... F02C 6/14 |
| 2020/0056546 A1 | 2/2020 | Terwilliger et al. |
| 2020/0056551 A1 | 2/2020 | Epstein |
| 2020/0290742 A1* | 9/2020 | Kumar .................. B64D 27/24 |
| 2020/0362728 A1* | 11/2020 | Davies .................... F01D 25/12 |

(Continued)

FOREIGN PATENT DOCUMENTS

| | | |
|---|---|---|
| CN | 107701313 A | 2/2018 |
| EP | 3007972 A1 | 4/2016 |
| FR | 3006991 A1 | 12/2014 |

*Primary Examiner* — David P. Olynick
(74) *Attorney, Agent, or Firm* — Dority & Manning, P.A.

(57) ABSTRACT

An aircraft that includes a hybrid-electric propulsion system is provided. In one aspect, the hybrid-electric propulsion system includes at least one propulsor that includes a gas turbine engine and an electric machine mechanically coupled with a spool of the gas turbine engine. When idle operation is commanded, electrical power is provided to the electric machine to cause the electric machine to apply torque to the spool and fuel provided to the engine can be reduced. Thus, the electric machine is controlled to provide a power assist to maintain the engine at the commanded idle speed whilst reducing fuel consumption.

18 Claims, 7 Drawing Sheets

(56) References Cited

U.S. PATENT DOCUMENTS

| | | | |
|---|---|---|---|
| 2021/0016888 A1* | 1/2021 | Terwilliger | F02K 5/00 |
| 2021/0025339 A1* | 1/2021 | Terwilliger | B64D 27/18 |
| 2021/0040896 A1* | 2/2021 | Feulner | F02C 7/275 |
| 2021/0140367 A1 | 5/2021 | Tantot et al. | |
| 2021/0254490 A1* | 8/2021 | Cristinacce | F02C 7/12 |

* cited by examiner

ELECTRIC MACHINE POWER ASSIST OF TURBINE ENGINE DURING IDLE OPERATION

FIELD

The present subject matter relates generally to aircraft propulsion systems, and more particularly to aircraft propulsion systems equipped with one or more electric machines.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing.

Hybrid-electric propulsion systems are being developed to improve an efficiency of conventional commercial aircraft. Some hybrid electric propulsion systems include one or more electric machines each being mechanically coupled with a rotating component of one of the aircraft engines. The inventors of the present disclosure have developed various architectures and methods to improve hybrid-electric propulsion systems.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
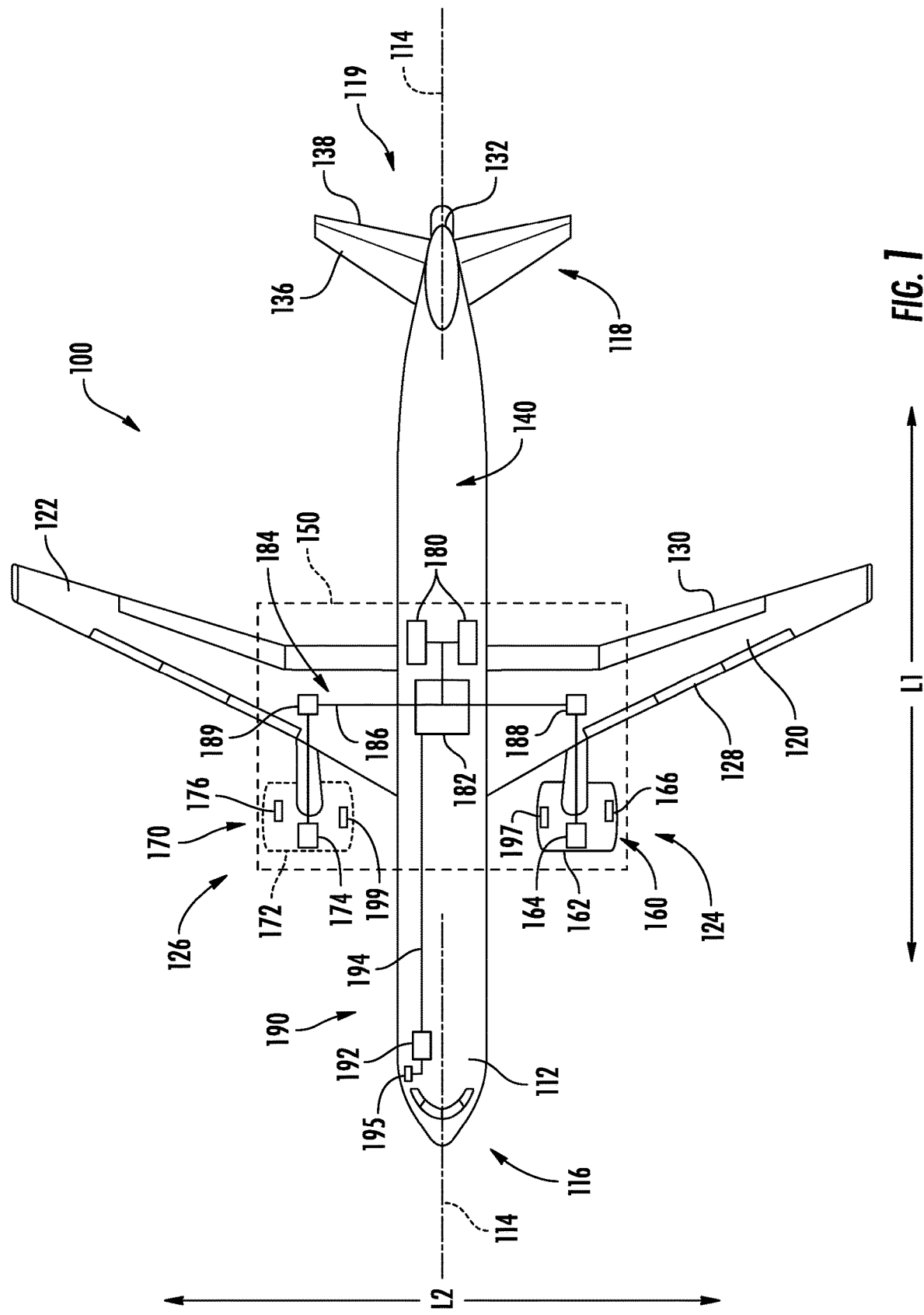
FIG. 1 provides a schematic top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

The term "exemplary" is intended to indicate an example herein. The term exemplary is not necessarily intended to indicate a best example or a preferred embodiment.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Conventionally, multi-engine aircraft have performed single-engine taxi operations to save fuel. However, the inventors of the present disclosure have recognized that operating a single engine without the other(s) during taxi operations may cause certain challenges, such as asymmetric thrust, increased pilot workload, and poor ground maneuvering and handling. Accordingly, the inventors of the present disclosure have developed a hybrid-electric architecture and control methods to address one or more of these noted challenges.

Particularly, in one example aspect, an aircraft includes a hybrid-electric propulsion system. The hybrid-electric propulsion system includes at least one propulsor that includes a gas turbine engine and an electric machine mechanically coupled with the gas turbine engine. For instance, the electric machine can be embedded within the engine core of the gas turbine engine and mechanically coupled to a spool thereof. The electric machine can be positioned inward of a core airflow path of the engine along a radial direction with respect to a longitudinal centerline of the engine. The spool can be a low pressure spool, for example. In other embodiments, the spool can be a high pressure spool of the gas turbine engine. In yet other embodiments, the gas turbine engine can include three spools, including a high pressure spool, an intermediate pressure spool, and a low pressure spool. In such embodiments, the spool can be the intermediate spool.

When idle operation is commanded, electrical power can be provided to the electric machine so that the electric machine applies torque to the spool. Moreover, fuel provided to the engine can be reduced. In this regard, the electric machine is controlled to provide a power assist to maintain the engine at the commanded idle speed whilst reducing fuel consumption. When additional engine power is commanded, fuel is increased and the engine accelerates. Advantageously, with a power assist provided to the gas turbine engine during idle operation, the gas turbine engine may produce fewer emissions and consume less fuel. Further, accelerating from idle may be quicker than a conventional engine due to relatively high engine rotational speeds and electric motor assistance.

In some embodiments, an aircraft can include at least one propulsor mounted to a first wing and at least one propulsor mounted to a second wing of the aircraft. Each propulsor can include a gas turbine engine and an electric machine mechanically coupled thereto. In such embodiments, a gas turbine engine of one of the propulsors is run on fuel while its associated electric machine generates electrical power that is transferred to the electric machine of the gas turbine engine of the other propulsor to keep it spinning at idle speeds. As both gas turbine engines are kept spinning, asymmetric thrust, increased pilot workload, and poor ground maneuvering and handling can be eliminated or at least reduced. Further, operating one gas turbine engine on fuel and supplying electrical power to drive the other gas turbine engine may result in the fuel-burning engine operating more efficiently. Notably, in such embodiments, engine control logic can alternate which engine receives the electric machine power assist during idle operation upon each startup. In this way, engine and electric machine wear may occur more evenly over the propulsors.

In some further embodiments, prior to or during startup, the hybrid-electric propulsion system can include features for preheating oil and/or pre-oiling or lubricating the gas turbine engines via electrically-driven devices. This may reduce engine wear on startup, especially at colder temperatures, and may also improve starting operability.

FIG. 1 provides a schematic top view of an exemplary aircraft 100 as may incorporate various embodiments of the present disclosure. For reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1.

As shown, the aircraft 100 extends between a forward end 116 and an aft end 118, e.g., along the longitudinal direction L1. Moreover, the aircraft 100 includes a fuselage 112 that extends longitudinally from the forward end 116 to the aft end 118 of the aircraft 100. The aircraft 100 also includes an empennage 119 at the tail or aft end 118 of the aircraft 100. In addition, the aircraft 100 includes a pair of wings including a first, port side wing 120 and a second, starboard side wing 122. The first and second wings 120, 122 each extend laterally outward from the fuselage 112 with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100. The longitudinal centerline 114 generally splits the aircraft 100 into first side 124 and the second side 126.

The aircraft 100 includes various control surfaces. For this embodiment, each wing 120, 122 includes one or more leading edge flaps 128 and one or more trailing edge flaps 130. The aircraft 100 further includes, or more specifically, the empennage 119 of the aircraft 100 includes, a vertical stabilizer 132 having a rudder flap 134 for yaw control and a pair of horizontal stabilizers 136 each having an elevator flap 138 for pitch control. The fuselage 112 additionally includes an outer surface or skin 140. It should be appreciated that in other exemplary embodiments the aircraft 100 may additionally or alternatively include any other suitable configuration. For example, in other embodiments, the aircraft 100 may include any other control surface configuration or empennage arrangement.

The exemplary aircraft 100 of FIG. 1 also includes a propulsion system. For this embodiment, the propulsion system is a hybrid-electric propulsion system 150. As shown, the hybrid-electric propulsion system 150 includes a first propulsor 160 and a second propulsor 170 both operable to produce thrust. The first propulsor 160 is mounted in an under-wing configuration to the first wing 120 and the second propulsor 170 is mounted in an under-wing configuration to the second wing 122. In other example embodiments, one or both of the first and second propulsors 160, 170 may be mounted to the aircraft 100 in other suitable locations and/or configurations, such as to the fuselage 112 aft of the wings 120, 122.

The first propulsor 160 includes a first gas turbine engine 162 and a first electric machine 164 mechanically coupled with the first gas turbine engine 162. The first electric machine 164 can be an electric generator, an electric motor, or a combination generator/motor. For this example embodiment, the first electric machine 164 is a combination generator/motor. In this manner, when operating as an electric generator, the first electric machine 164 can generate electrical power when driven by the first gas turbine engine 162. When operating as an electric motor, the first electric machine 164 can drive or motor the first gas turbine engine 162. Moreover, for this example embodiment, the first gas turbine engine 162 is configured as a turbofan, and thus, the first propulsor 160 is configured as a hybrid-electric turbofan.

Likewise, the second propulsor 170 includes a second gas turbine engine 172 and a second electric machine 174 mechanically coupled with the second gas turbine engine 172. The second electric machine 174 can be an electric generator, an electric motor, or a combination generator/motor. For this example embodiment, the second electric machine 174 is a combination generator/motor. In this manner, when operating as an electric generator, the second electric machine 174 can generate electrical power when driven by the second gas turbine engine 172. When operating as an electric motor, the second electric machine 174 can drive or motor the second gas turbine engine 172. Furthermore, for this example embodiment, the second gas turbine engine 172 is configured as a turbofan, and thus, the second propulsor 170 is configured as a hybrid-electric turbofan.

The hybrid-electric propulsion system 150 further includes one or more electric energy storage units 180 electrically connectable to the first and second electric machines 164, 174 as well as to other electrical loads. The electric energy storage units 180 may be configured as one or more batteries, such as one or more lithium-ion batteries, or alternatively may be configured as any other suitable electrical energy storage devices, such as supercapacitors.

The hybrid-electric propulsion system 150 also includes a power management system having a controller 182, a power bus 184, and power electronics, such as first and second power converters 188, 189. The first power converter 188 is associated with the first electric machine 164 of the first propulsor 160 and the second power converter 189 is associated with the second electric machine 174 of the second propulsor 170. The first and second electric machines 164, 174, the electric energy storage units 180, the controller 182, and power converters 188, 189 are each electrically connectable to one another through one or more electric lines 186 of the power bus 184.

The first and second power converters 188, 189 are operable to condition and/or convert electrical power within the hybrid-electric propulsion system 150. The first and second power converters 188, 189 can both include switching elements and gate drivers for rapidly driving the switching elements, e.g., between on and off modes. The power bus 184 may include other electric components as well, such as switches and/or other power electronics.

The controller 182 is configured to control the distribution of electrical power between the various components of the hybrid-electric propulsion system 150. For example, the controller 182 may control the power converters 188, 189 to provide electrical power to, or draw electrical power from, various components. For instance, the controller 182 may control one or both of the power converters 188, 189 so that electrical power is drawn from the one or more electric energy storage units 180 and provided the first and/or second electric machines 164, 174, e.g., during idle operation. As another example, the controller 182 may control the first and second power converters 188, 189 so that electrical power is drawn from second electric machine 174 of the second propulsor 170 and provided to the first electric machine 164 of the first propulsor 160, e.g., during idle operation. Such is depicted schematically as the electric lines 186 of the power bus 184 extend through the controller 182.

The controller 182 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes controller 182 as well as other computing devices, such as a computing device 192. The computing system 190 can include other computing devices as well, such as a first engine controller 166 of the first propulsor 160 and a second engine controller 176 of the second propulsor 170. The computing devices of the computing system 190 can be communicatively coupled with one another via a communication network. For instance, the computing device 192 is located in the cockpit of the aircraft 100 and is communicatively coupled with the controller 182 of the hybrid-electric propulsion system 150 via a communication link 194 of the communication network. The communication link 194 can include one or more wired or wireless communication links. Although not depicted in FIG. 1, it will be appreciated that the first and second controllers 166, 176 can be communicatively coupled with the other components and/or devices of the computing system 190 as well, e.g., via suitable wired or wireless communication links.

The computing devices of the computing system 190 of the aircraft 100 may be configured in substantially the same manner as the exemplary computing devices of the computing system 500 described below with reference to FIG. 7 (and may be configured to perform one or more of the functions of the exemplary method (400) described below).

The aircraft 100 can also include a plurality of sensors for sensing various operating conditions associated with the aircraft 100. The plurality of sensors are represented schematically in FIG. 1 by sensors 195, 197, 199. The sensors 195, 197, 199 can be communicatively coupled with one or more of the computing devices of the computing system 190. Sensor 195 schematically represents that the aircraft 100 can include one or more airspeed sensors, temperature sensors, pressure sensors, altitude sensors, weight sensors, sensors for recording ambient conditions, and the like. Sensors 197, 199 schematically represent that the first and second propulsors 160, 170 can include one or more sensors, such as temperature sensors, pressure sensors, fuel flow sensors, current sensors, voltage sensors, etc. Sensor data captured by the sensors 195, 197, 199 can be provided to the one or more processors of the computing system 190.

Figure 2:
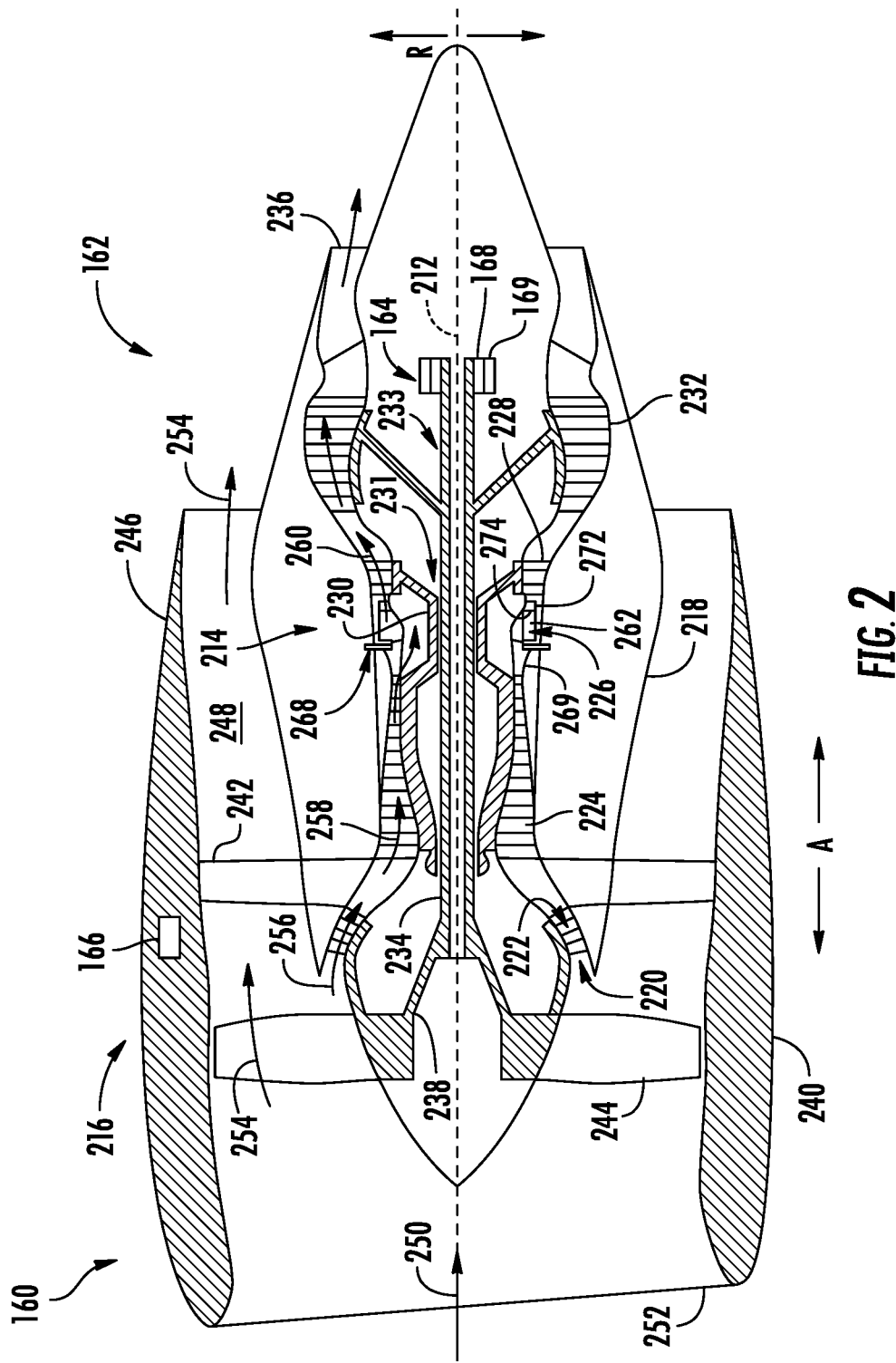
FIG. 2 provides a schematic cross-sectional view of one of the propulsors of the aircraft of FIG. 1.

FIG. 2 provides a schematic cross-sectional view of the first propulsor 160 of the aircraft 100 of FIG. 1. Although the first propulsor 160 is shown in FIG. 2 and described below in detail, it will be appreciated that the second propulsor 170 of the aircraft 100 of FIG. 1 can be configured in the same or similar manner as the first propulsor 160. Thus, for the sake of brevity, only the first propulsor 160 will be described in detail below.

For reference, the first gas turbine engine 162 of the first propulsor 160 defines an axial direction A, a radial direction R, and a circumferential direction. Moreover, the first gas turbine engine 162 defines an axial centerline or longitudinal axis 212 that extends therethrough for reference purposes. In general, the axial direction A extends parallel to the longitudinal axis 212, the radial direction R extends outward from and inward to the longitudinal axis 212 in a direction orthogonal to the axial direction A, and the circumferential direction extends three hundred sixty degrees (360°) around the longitudinal axis 212.

The first gas turbine engine 162 includes a core engine 214 and a fan section 216 positioned upstream thereof. The core engine 214 includes an engine cowl 218 that defines an annular core inlet 220. The engine cowl 218 further encloses and supports a booster or low pressure compressor 222 for pressurizing the air that enters core engine 214 through core inlet 220. A high pressure, multi-stage, axial-flow compressor 224 receives pressurized air from the LP compressor 222 and further increases the pressure of the air. The pressurized air stream flows downstream to a combustor 226 where fuel is injected into the pressurized air stream and ignited to raise the temperature and energy level of the pressurized air. The high energy combustion products flow from the combustor 226 downstream to a high pressure turbine 228 for driving the high pressure compressor 224 through a high pressure shaft 230 or a second rotatable component. The HP shaft 230, the rotating elements of the HP compressor 224 coupled with the HP shaft 230, and the rotating elements of the HP turbine 228 collectively form the high speed or high pressure spool 231.

The high energy combustion products then flow to a low pressure turbine 232 for driving the LP compressor 222 and the fan section 216 through a low pressure shaft 234 or a first rotatable component. The LP shaft 234 is coaxial with the HP shaft 230 in this example embodiment. The LP shaft 234, the rotating elements of the LP compressor 222 coupled with the LP shaft 234, the rotating elements of the LP turbine 232, and rotating elements of the fan section 216 collectively form the low speed or low pressure spool 233. After driving each of the turbines 228, 232, the combustion products exit the core engine 214 through an exhaust nozzle 236 to produce propulsive thrust.

The fan section 216 includes a rotatable, axial-flow fan rotor 238 that is surrounded by an annular fan casing 240.

The fan casing 240 is supported by the core engine 214 by a plurality of substantially radially-extending, circumferentially-spaced outlet guide vanes 242. In this way, the fan casing 240 encloses the fan rotor 238 and a plurality of fan blades 244 extending outward from the fan rotor 238. A downstream section 246 of the fan casing 240 extends over an outer portion of the core engine 214 to define a bypass passage 248. Air that passes through the bypass passage 248 provides propulsive thrust as will be explained further below. In some alternative embodiments, the LP shaft 234 may be connected to the fan rotor 238 via a speed reduction device, such as a reduction gear gearbox in an indirect-drive or geared-drive configuration. Such speed reduction devices can be included between any suitable shafts/spools within the first gas turbine engine 162 as desired or required.

During operation of the first gas turbine engine 162, an initial or incoming airflow, represented by arrow 250, enters the first gas turbine engine 162 through an inlet 252 defined by the fan casing 240. The airflow 250 passes through the fan blades 244 and splits into a first air flow (represented by arrow 254) that moves through the bypass passage 248 and a second air flow (represented by arrow 256) which enters the LP compressor 222 through the core inlet 220.

The pressure of the second airflow 256 is progressively increased by the LP compressor 222 and then enters the HP compressor 224, as represented by arrow 258. The discharged pressurized air stream flows downstream to the combustor 226 where fuel is introduced to generate combustion gases or products. The combustion products 260 exit the combustor 226 and flow through the HP turbine 228. The combustion products 260 then flow through the LP turbine 232 and exit the exhaust nozzle 236 to produce thrust. Moreover, as noted above, a portion of the incoming airflow 250 flows through the bypass passage 248 and through an exit nozzle defined between the fan casing 240 and the engine cowl 218 at the downstream section 246 of the fan casing 240. In this way, substantial propulsive thrust is produced.

As further shown in FIG. 2, the combustor 226 defines an annular combustion chamber 262 that is generally coaxial with the longitudinal centerline axis 212. The combustor 226 receives an annular stream of pressurized air from a high pressure compressor discharge outlet 269. A portion of this compressor discharge air ("CDP" air) flows into a mixer (not shown). Fuel is injected by a fuel nozzle 268 of a fuel delivery system to mix with the air. This forms a fuel-air mixture that is provided to the combustion chamber 262 for combustion. Ignition of the fuel-air mixture is accomplished by a suitable igniter, and the resulting combustion gases 260 flow in an axial direction A toward and into an annular, first stage turbine nozzle 272. The nozzle 272 is defined by an annular flow channel that includes a plurality of radially-extending, circumferentially-spaced nozzle vanes 274 that turn the gases so that they flow angularly and impinge upon the first stage turbine blades of the HP turbine 228. For this embodiment, the HP turbine 228 rotates the HP compressor 224 via the HP shaft 230 and the LP turbine 232 drives the LP compressor 222 and the fan rotor 38 via the LP shaft 234.

As noted above, the first propulsor 160 is an aeronautical electric-hybrid propulsion machine. In this regard, the first propulsor 160 includes one or more electric machines, such as first electric machine 164, mechanically coupled with the first gas turbine engine 162. In accordance with the inventive aspects of the present disclosure, the first electric machine 164 can be controlled to provide power assistance to the first gas turbine engine 162, e.g., during idle operations. For the depicted embodiment of FIG. 2, the first electric machine 164 is mechanically coupled with the LP shaft 234. More particularly, the first electric machine 164 includes a rotor 168 and a stator 169. The rotor 168 of the first electric machine 164 is mechanically coupled with the LP shaft 234. In this regard, the rotor 168 is rotatable in unison with the LP shaft 234. As will be appreciated, the rotor 168 can include current-carrying elements (e.g., windings or coils). The stator 169 can include current-carrying elements and/or magnets. In this regard, when the rotor 168 is rotated relative to the stator 169, a rotor magnetic field is coupled with the stator magnetic field to enable energy conversion.

Although the first electric machine 164 is mechanically coupled with the LP shaft 234 at an aft end of the LP shaft 234, the first electric machine 164 can be mounted to the LP shaft 234 at any suitable location. Further, in other embodiments, the first electric machine 164 can be mounted to the HP shaft 230. In yet other embodiments, the first propulsor 160 can include an electric machine mechanically coupled with the HP shaft 230 and an electric machine mechanically coupled with the LP shaft 234. As will be explained herein, the first electric machine 164 can be controlled to apply torque to the LP shaft 234 to keep the first gas turbine engine 162 turning at least at a minimum idle speed while reducing fuel flow to the combustor 226 when idle power is commanded. Stated another way, the first electric machine 164 can be controlled to electrically assist the LP shaft 234 during idle operations, which may advantageously reduce fuel consumption and wear on engine components, among other benefits. The manner in which the first electric machine 164 can be utilized to electrically assist the LP shaft 234 during idle operations will be described in more detail herein.

Although the first propulsor 160 has been described and illustrated in FIG. 2 as representing an example hybrid-electric propulsion machine, the subject matter of the present disclosure may apply to or be incorporated with other suitable types of hybrid-electric turbomachines. For instance, the subject matter of the present disclosure may apply to or be incorporated with other suitable turbine engines, such as steam and other types of gas turbine engines. Example gas turbine engines may include turbojets, turboprop, turboshaft, aeroderivatives, auxiliary power units, etc.

Figure 3:
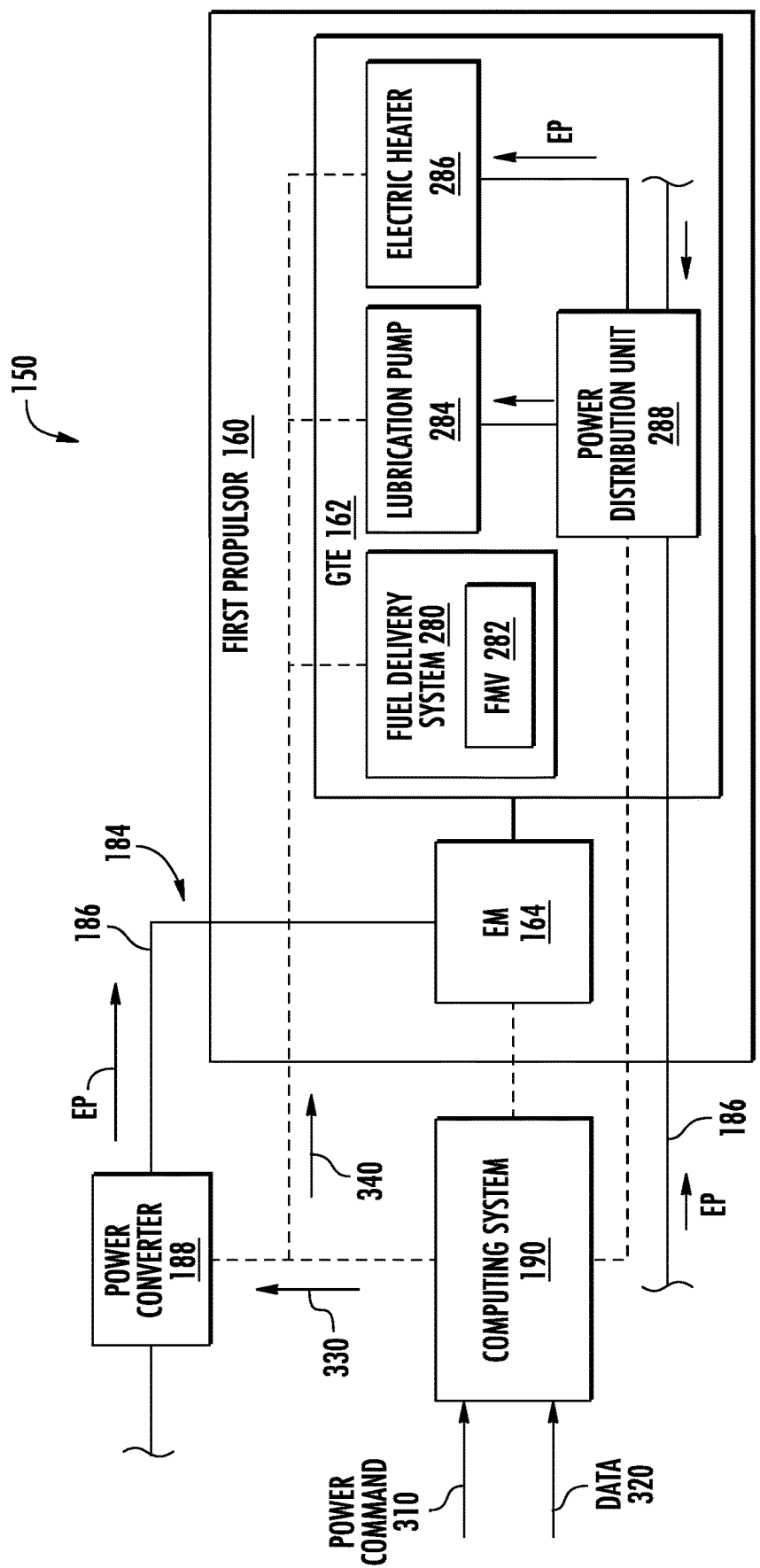
FIG. 3 provides a schematic view of a hybrid-electric propulsion system of the aircraft of FIG. 1.

With general reference now to FIGS. 1, 2, and 3, a control scheme for controlling the first electric machine 164 to provide a power assist to the first gas turbine engine 162 during idle operation will now be provided. FIG. 3 provides a schematic view of the hybrid-electric propulsion system 150 of the aircraft 100 that may implement such a control scheme. By controlling the first electric machine 164 to provide a power assist to the first gas turbine engine 162 during idle operation, fuel consumption and wear on engine components can be reduced, among other benefits. Although the power converter 188 and the computing system 190 are shown in FIG. 3 as separate from the first propulsor 160, it will be appreciated that in some embodiments that the power converter 188 can be a component of the first propulsor 160 and/or that components of the computing system 190, such as first engine controller 166 (FIG. 1), may be a component of the first propulsor 160. Moreover, although not shown, other elements of the hybrid-electric propulsion system 150 of FIG. 1 can be controlled by the computing system 190, such as the second propulsor 170 and its associated power converter 189.

As shown in FIG. 3, one or more processors of the computing system 190 can receive an indication that the first gas turbine engine 162 is to operate in an idle condition, or stated differently, in idle operation. Particularly, the one or more processors of the computing system 190 can receive a power command 310 indicating the first gas turbine engine 162 is to operate in an idle condition. The power command 310 can be generated, for example, based on a Thrust Lever Angle (TLA) of a thrust lever situated within a cockpit of the aircraft 100 or according to an autothrust function generated by an autoflight system of the aircraft 100.

In addition, the one or more processors of the computing system 190 can receive data 320 indicating one or more operating conditions associated with the aircraft 100, which may include operating conditions associated with the first gas turbine engine 162 and/or operating conditions associated with the first electric machine 164 mechanically coupled thereto. The data 320 can be based on sensor feedback from sensors 195, 197, 199 (FIG. 1), for example. The operating conditions can include, without limitation, ambient conditions, e.g., ambient air temperature, humidity, wind conditions, air pressure, weather conditions, etc., the airspeed of the aircraft 100, the altitude of the aircraft 100, the orientation of the aircraft 100, the health of one or more of the components of the first gas turbine engine 162, the first electric machine 164, or some other component of the aircraft 100, engine bleed demands, the current electrical power demanded by the electrical loads and/or systems of the aircraft 100, or some combination of the foregoing.

In response to the power command 310, the one or more processors of the computing system 190 can cause electrical power to be provided to the first electric machine 164 so that the first electric machine 164 applies torque to the low pressure spool 233 (FIG. 2) of the first gas turbine engine 162. In this way, the first electric machine 164 can provide a power assist to the first gas turbine engine 162. For instance, upon receiving the power command 310, the one or more processors of the computing system 190 can generate one or more control signals 330. The control signals 330 can be routed to the power converter 188 associated with the first electric machine 164. The control signals 330 can cause one or more gate drivers to drive or switch the switching elements of the power converter 188 so that the desired electrical power is provided to the first electric machine 164, as indicated by the arrow EP in FIG. 3. As noted, electrical power can be provided to the first electric machine 164 via one or more electric lines 186 of the power bus 184.

The electrical power provided to the first electric machine 164 can be drawn from or provided by one or more suitable sources. For instance, without limitation, the electrical power provided to the first electric machine 164 can be provided from one or more energy storage units 180 (FIG. 1), an electric machine mechanically coupled with an Auxiliary Power Unit (APU) positioned onboard the aircraft 100, an electric machine mechanically coupled with a ram air turbine, the second electric machine 174 of the second propulsor 170 (FIG. 1) operating in a generator mode as will be explained further below with reference to FIG. 4, or some combination of the foregoing. The APU can be a gas turbine engine, for example. The electrical power provided to the first electric machine 164 causes the first electric machine 164 (e.g., via interaction of the stator magnetic field and the rotor magnetic field) to apply torque to the low pressure spool 233 (FIG. 2) to drive the low pressure spool 233 about its axis of rotation.

In some embodiments, in addition to causing the first electric machine 164 to drive the low pressure spool 233 of the first gas turbine engine 162, the one or more processors of the computing system 190 can reduce the fuel provided to the combustor 226 (FIG. 2) of the first gas turbine engine 162. More specifically, in response to the power command 310, the one or more processors of the computing system 190 can cause a reduction in an amount of fuel provided to the combustor 226 of the first gas turbine engine 162 as the first electric machine 164 applies torque to the low pressure spool 233. As the first electric machine 164 assists with driving the low pressure spool 233, less fuel is required to meet the desired thrust output or power commanded. Accordingly, the amount of fuel provided to the first gas turbine engine 162 can be decreased and the first propulsor 160 can still meet the power commanded.

For instance, upon receiving the power command 310, the one or more processors of the computing system 190 can generate one or more control signals 340. The control signals 340 can be routed to one or more components of a fuel delivery system 280, such as a fuel metering valve 282. Based on the received control signals 340, the fuel metering valve 282 can control the amount of fuel provided to the combustor 226 of the first gas turbine engine 162. Particularly, upon receiving the control signals 340, the fuel metering valve of the fuel delivery system 280 can modulate so as to reduce the amount of fuel provided to the combustor 226 of the first gas turbine engine 162.

The one or more processors of the computing system 190 can control the electrical power provided to the first electric machine 164 and the fuel to the first gas turbine engine 162 during idle operations based on the power command 310 as noted above. However, in some embodiments, the one or more processors of the computing system 190 can control the electrical power (or a rate of electrical power) provided to the first electric machine 164 and the fuel to the first gas turbine engine 162 based on the mode or type of idle operation, as determined by the operating conditions or some other indication (such as a position or angle of a power lever). Stated another way, the electrical power provided to the first electric machine 164 and the amount of fuel provided to the first gas turbine engine 162 can be controlled based on the type of idle operation. As one example, the first gas turbine engine 162 can be configured to operate in a ground idle mode (or low idle mode) and a flight idle mode (or high idle mode). Ground idle mode is an idle mode operation used when the aircraft 100 is on the ground, e.g., during taxi operations. Flight idle mode is an idle mode operation in which the aircraft 100 is airborne, e.g., during approach operations.

For instance, in some embodiments, the one or more processors of the computing system 190 are configured to determine whether the gas turbine engine is operating in a ground idle mode or a flight idle mode based at least in part on the received data 320, or more particularly, based on values for one or more operating conditions received as part of the data 320. As one example, the data 320 can include a value corresponding to a Height Above Ground Level (HAGL). When the HAGL is at zero, the one or more processors of the computing system 190 can determine that the aircraft 100 is on the ground. Thus, the one or more processors of the computing system 190 can determine that the first gas turbine engine 162 is operating in a ground idle mode. In contrast, when the HAGL is above zero, the one or more processors of the computing system 190 can determine that the aircraft 100 is airborne. Thus, the one or more processors of the computing system 190 can determine that the first gas turbine engine 162 is operating in a flight idle mode. It will be appreciated that the HAGL is only one example parameter that can be used to determine whether the first gas turbine engine 162 is operating in a ground idle mode or a flight idle mode. Other suitable parameters can be used as well, such as airspeed, an orientation of the aircraft 100, etc. Generally, determining whether the first gas turbine engine 162 is operating in a ground idle mode or a flight idle mode can be done in any suitable manner using any suitable logic approach.

The one or more processors of the computing system 190 can control the electrical power provided to the electric machine 164 and the amount of fuel provided to the combustor 226 of the first gas turbine engine 162 based at least in part on the type or determined mode of idle operation, or stated differently, based at least in part on a state of the idle condition.

As one example, when the one or more processors of the computing system 190 determine that the first gas turbine engine 162 is operating in a flight idle mode, the one or more processors of the computing system 190 can cause a rate of electrical power to be provided to the first electric machine 164 so that a predetermined margin is present between a present torque output of the first electric machine 164 and a maximum rated torque output of the first electric machine 164. For instance, in one example embodiment, the predetermined margin can be twenty percent (20%). In such an example embodiment, the one or more processors of the computing system 190 can cause electrical power to be provided to the first electric machine 164 so that the first electric machine 164 does not apply a torque output that is within twenty percent (20%) of its maximum rated torque output. For instance, the one or more processors of the computing system 190 can cause electrical power to be provided to the first electric machine 164 so that the first electric machine 164 produces a torque output that is seventy-nine percent (79%) of its maximum rated torque output. With the power assist from the first electric machine 164, the fuel provided to the combustor 226 can be decreased accordingly and so that the power command 310 is met.

Notably, the predetermined margin present between the present torque output of the first electric machine 164 and the maximum rated torque output of the first electric machine 164 can allow for the first electric machine 164 to increase the power output of the first gas turbine engine 162 nearly instantaneously 162 as needed during flight, e.g., to assist in the event of a missed approach. For instance, in the event significantly more power is commanded in a subsequent power command, the one or more processors can cause electrical power to be provided to the first electric machine 164 so that the first electric machine 164 operates at its maximum rated torque output (i.e., at 100% of its maximum rated torque output). The first electric machine 164 can be operated at its maximum rated torque output for a period of time, e.g., until the first gas turbine engine 162 has time to spool up to meet the subsequent power command.

In contrast, when the one or more processors of the computing system 190 determine that the first gas turbine engine 162 is operating in a ground idle mode, the one or more processors of the computing system 190 can cause electrical power to be provided to the first electric machine 164 so that the first electric machine 164 is operated at its maximum rated torque output. This would reduce the fuel required by the first gas turbine engine 162 by the most margin. On the ground, it may not be necessary to allow for instantaneous power assists such as may be involved in flight idle operations, and consequently, generally, the first electric machine 164 can be operated closer to its maximum rated torque output to minimize fuel use.

In yet other embodiments, when the one or more processors of the computing system 190 determine that the first gas turbine engine 162 is operating in a ground idle mode, the one or more processors of the computing system 190 can cause electrical power to be provided to the first electric machine 164 so that a ground predetermined margin is present between a present torque output of the first electric machine 164 and a maximum rated torque output of the first electric machine 164. For instance, in one example embodiment, the ground predetermined margin can be ten percent (10%). In such an example embodiment, the one or more processors of the computing system 190 can cause electrical power to be provided to the first electric machine 164 so that the first electric machine 164 does not apply a torque output that is within ten percent (10%) of its maximum rated torque output. For instance, the one or more processors of the computing system 190 can cause electrical power to be provided to the first electric machine 164 so that the first electric machine 164 produces a torque output that is eighty-nine percent (89%) of its maximum rated torque output. With the power assist from the first electric machine 164, the fuel provided to the combustor 226 can be decreased accordingly and so that the power command 310 is met. Further, in such embodiments, there is some predetermined margin to assist the first gas turbine engine 162 nearly instantaneously with the first electric machine 164, e.g., to assist a pilot in avoiding an obstacle while taxing without need to restart or spool up the first gas turbine engine 162. Such a predetermined margin may also be useful to ensure some margin is available to maintain the first gas turbine engine 162 at least at a minimum idle speed, or a minimum speed at which the first gas turbine engine 162 must turn to keep the compressors of the first gas turbine engine 162 spinning.

In some embodiments, the first electric machine 164 can be utilized to start up and then continue to assist the first gas turbine engine 162 during ground idle operation. In such embodiments, it will be appreciated that the amount of fuel provided to the first gas turbine engine 162 may not be reduced upon a power command to operate the first gas turbine engine 162 in an idle condition. Rather, the amount of fuel provided to the first gas turbine engine 162 would already be reduced or less than the amount would be in the absence of the power assist provided by the first electric machine 164. However, the first electric machine 164 need not assist the first gas turbine engine 162 during start up, and, in such instances, when the first electric machine 164 is controlled to assist the first gas turbine engine 162, the fuel provided to the first gas turbine engine 162 can be reduced as described above.

In some embodiments, such as depicted in FIG. 3, the first gas turbine engine 162 includes a lubrication pump, or more particularly, an electrically-driven lubrication pump 284. In such embodiments, the one or more processors of the computing system 190 can be configured to cause the electrically-driven lubrication pump 284 to lubricate one or more components of the first gas turbine engine 162 prior to or during start-up operation or while operating in the idle condition. For instance, the electrically-driven lubrication pump 284 can be configured to lubricate one or more bearings supporting the low pressure spool 233 and/or one or more bearings supporting the high pressure spool 231 with a lubricating fluid, such as oil. In addition, seals and other moving parts of the first gas turbine engine 162 can be lubricated as well. Pre-oiling or lubricating the one or more components of the first gas turbine engine 162 can reduce engine wear on startup, especially at colder temperatures, and may improve starting operability.

The electrically-driven lubrication pump 284 can include an electric motor and a pump. The electric motor drives the pump, e.g., when electrical power is provided to the electric motor. As the electric motor is configured to drive the pump, the lubrication pump is decoupled from the engine core. That is, the electrically-driven lubrication pump 284 can be decoupled from the high pressure spool 231, as well as the low pressure spool 233. This allows the electrically-driven lubrication pump 284 to be operated without need to the turn the first gas turbine engine 162. Accordingly, this offers the ability to pre-lubricate the first gas turbine engine 162 prior to turning the first gas turbine engine 162, or stated another way, prior to startup of the first gas turbine engine 162.

Electrical power can be provided to the electric motor of the electrically-driven lubrication pump 284 from any suitable source. For instance, as one example, the one or more processors of the computing system 190 can cause electrical power to be drawn from the one or more energy storage units 180 (FIG. 1) and provided to the electrically-driven lubrication pump 284. For instance, the one or more processors of the computing system 190 can cause power electronics positioned along the power bus 184 to draw electrical power from the one or more energy storage units 180 and direct the electrical power to the first gas turbine engine 162 along one or more electric lines 186 of the power bus 184. The one or more processors of the computing system 190, such as first engine controller 166, can control a power distribution unit 288 to distribute electrical power to the electrically-driven lubrication pump 284 so that the one or more components of the first gas turbine engine 162 are lubricated, e.g., prior to engine startup. The power distribution unit 288 can include one or more switches, power electronics, controllers, etc., for distributing electrical power. Electrical power can be provided to the power distribution unit 288 from any suitable source, such as the one or more energy storage units 180 as noted above or from an alternator or generator of an Integrated Drive Generator (IDG) during engine operation.

In some further embodiments, as shown in FIG. 3, the first gas turbine engine 162 includes has a heater, or more particularly, an electric heater 286. In such embodiments, the one or more processors of the computing system 190 can be configured to cause the electric heater 286 to heat a lubrication fluid (e.g., oil) associated with the first gas turbine engine 162 prior to or during start-up operation or while operating in the idle condition. In some embodiments, the electric heater 286 can heat the oil that is used to pre-lubricate the one or more components of the first gas turbine engine 162 by the electrically-driven lubrication pump 284. Pre-heating and lubricating the one or more components of the first gas turbine engine 162 can reduce engine wear on startup and may improve starting operability.

Electrical power can be provided to the electric heater 286 from any suitable source. For instance, as one example, the one or more processors of the computing system 190 can cause electrical power to be drawn from the one or more energy storage units 180 (FIG. 1) and provided to the electric heater 286. For instance, the one or more processors of the computing system 190 can cause power electronics positioned along the power bus 184 to draw electrical power from the one or more energy storage units 180 and direct the electrical power to the first gas turbine engine 162 along one or more electric lines 186 of the power bus 184. The one or more processors of the computing system 190, such as first engine controller 166, can control the power distribution unit 288 to distribute electrical power to the electric heater 286 so that the lubrication fluid (e.g., oil) is heated, e.g., prior to engine startup.

Figure 4:
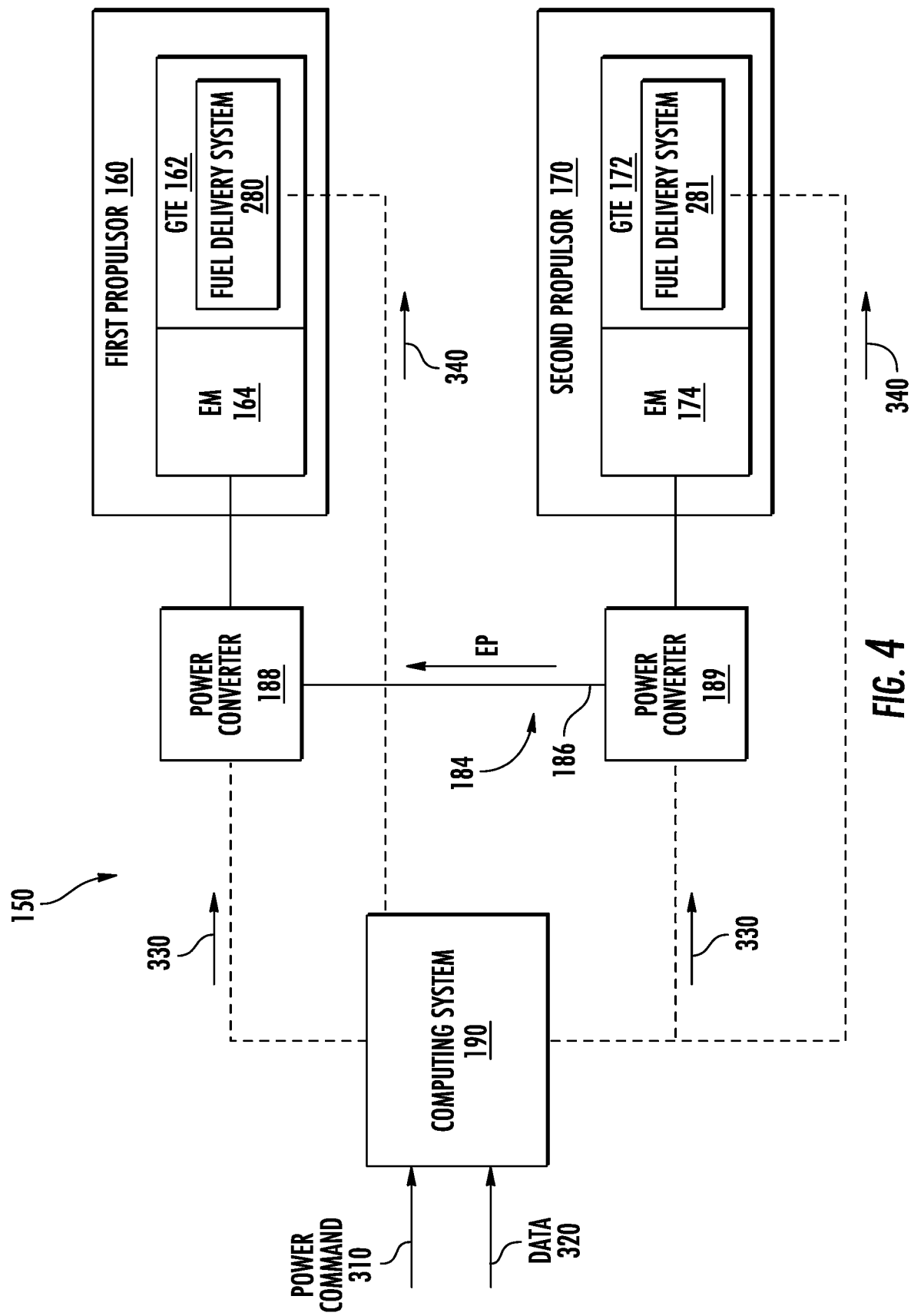
FIG. 4 provides another schematic view of the hybrid-electric propulsion system of the aircraft of FIG. 1.

FIG. 4 provides another schematic view of the hybrid-electric propulsion system 150 of the aircraft 100. For this embodiment, the computing system 190 coordinates electrical power distribution between the first propulsor 160 and the second propulsor 170, e.g., for electric machine power assists. As depicted in the example of FIG. 4, the first propulsor 160 includes first multi-spool gas turbine engine 162 and first electric machine 164 mechanically coupled thereto. The first electric machine 164 can be embedded within the engine core of the first multi-spool gas turbine engine 162 and can be coupled with the low pressure spool 233 (FIG. 2) of the first multi-spool gas turbine engine 162, for example. In other embodiments, the first electric machine 164 can be coupled with the high pressure spool 231 (FIG. 2) of the first multi-spool gas turbine engine 162.

The second propulsor 170 includes second multi-spool gas turbine engine 172 and second electric machine 174 mechanically coupled thereto. The second electric machine 174 can be embedded within the engine core of the second multi-spool gas turbine engine 172 and can be coupled with the low pressure spool of the second multi-spool gas turbine engine 172, for example. In other embodiments, the second electric machine 174 can be coupled with the high pressure spool of the second multi-spool gas turbine engine 172. The first propulsor 160 is mounted to the first wing 120 and the second propulsor 170 is mounted to the second wing 122, e.g., as shown in FIG. 1.

In such embodiments, upon receiving the power command 310 indicating that at least one of the first and second multi-spool gas turbine engines 162, 172 is to operate in an idle condition, the one or more processors of the computing system 190 are configured to cause the second multi-spool gas turbine engine 172 to drive the second electric machine 174 so that the second electric machine 174 generates electrical power. In this regard, the second electric machine 174 is controlled to operate in a generator mode. Further, the one or more processors of the computing system 190 are configured to cause electrical power generated by the second electric machine 174 to be provided to the first electric machine 164 so that the first electric machine 164 applies torque to the spool of the first multi-spool gas turbine engine 162 to which the first electric machine 164 is coupled. In some embodiments, the spool to which torque is applied can be a low pressure spool of the first multi-spool gas turbine engine 162. In other embodiments, the spool to which torque is applied can be a high pressure spool of the first multi-spool gas turbine engine 162, e.g., for the purpose of maintaining a ready idle condition on the core.

The one or more processors of the computing system 190 can also be configured to reduce the fuel provided to the first multi-spool gas turbine engine 162, e.g., by controlling the fuel delivery system 280 thereof. Operating the aircraft 100 using such a control scheme can result in the fuel-burning engine (e.g., the second multi-spool gas turbine engine 172 from the example above) operating more efficiently whilst maintaining more symmetric power output between the two multi-spool gas turbine engines 162, 172. Further, the net fuel consumption used by the two multi-spool gas turbine engines 162, 172 can be reduced in view of the power assist provided by the first electric machine 164.

In some embodiments, electrical power generated by the first electric machine 164 of the first propulsor 160 can be directed to the second electric machine 174 of the second propulsor 170 so as to provide a power assist to the second multi-spool gas turbine engine 172. Particularly, in some embodiments, upon receiving the power command 310 indicating that at least one of the first and second multi-spool gas turbine engines 162, 172 is to operate in an idle condition, the one or more processors of the computing system 190 are configured to cause the first multi-spool gas turbine engine 162 to drive the first electric machine 164 so that the first electric machine 164 generates electrical power. In this regard, the first electric machine 164 is controlled to operate in a generator mode. Further, the one or more processors of the computing system 190 are configured to cause electrical power generated by the first electric machine 164 to be provided to the second electric machine 174 so that the second electric machine 174 applies torque to the spool of the second multi-spool gas turbine engine 172 to which it is coupled. The one or more processors of the computing system 190 can also be configured to reduce the fuel provided to the second multi-spool gas turbine engine 172, e.g., by controlling the fuel delivery system 210 thereof.

Figure 5:
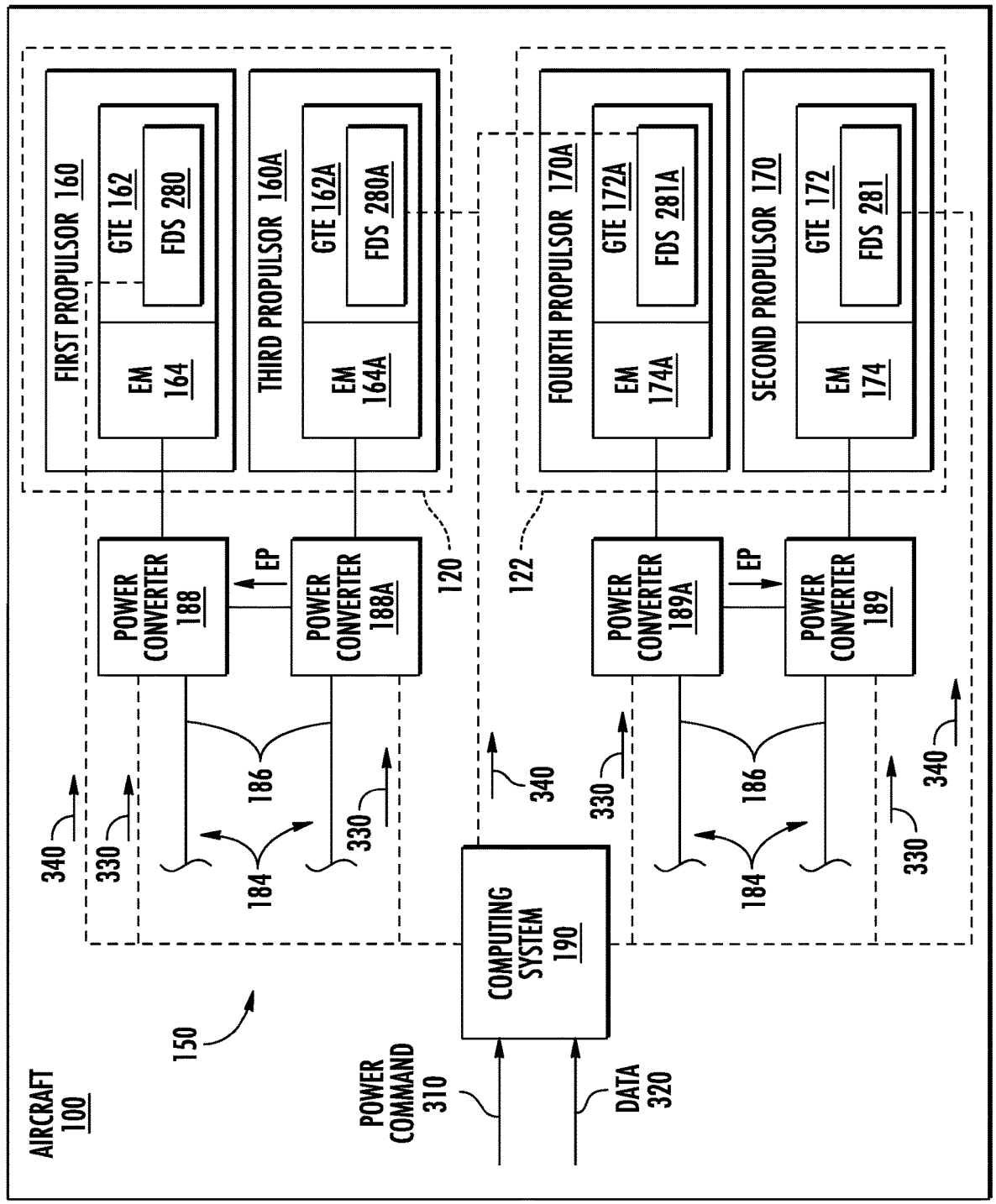
FIG. 5 provides a schematic view of a hybrid-electric propulsion system of an aircraft according to various exemplary embodiments of the present disclosure.

FIG. 5 provides a schematic view of a hybrid-electric propulsion system 150 for an aircraft 100 according to one example embodiment of the present disclosure. For the depicted embodiment of FIG. 5, the hybrid-electric propulsion system 150 of the aircraft 100 includes the first propulsor 160 and a third propulsor 160A. The first propulsor 160 and the third propulsor 160A are both mounted to first wing 120, e.g., in an under-wing configuration. The first propulsor 160 can be positioned outward of the third propulsor 160A along a lateral direction with respect to the fuselage. The hybrid-electric propulsion system 150 of the aircraft 100 also includes the second propulsor 170 and a fourth propulsor 170A. The second propulsor 170 and the fourth propulsor 170A are both mounted to second wing 122, e.g., in an under-wing configuration. The first wing 120 and the second wing 122 may extend laterally outward from a fuselage of the aircraft 100 in opposite directions, e.g., as shown in FIG. 1. The second propulsor 170 can be positioned outward of the fourth propulsor 170A along the lateral direction with respect to the fuselage.

The first propulsor 160 includes first multi-spool gas turbine engine 162 and first electric machine 164 mechanically coupled thereto. The first electric machine 164 can be embedded within the engine core of the first multi-spool gas turbine engine 162 and can be coupled with a low pressure spool or a high pressure spool of the first multi-spool gas turbine engine 162, for example. Likewise, the third propulsor 160A includes a third multi-spool gas turbine engine 162A and third electric machine 164A mechanically coupled thereto. The third electric machine 164A can be embedded within the engine core of the third multi-spool gas turbine engine 162A and can be coupled with a low pressure spool or a high pressure spool of the third multi-spool gas turbine engine 162A.

The second propulsor 170 includes the second multi-spool gas turbine engine 172 and the second electric machine 174 mechanically coupled thereto. The second electric machine 174 can be embedded within the engine core of the second multi-spool gas turbine engine 172 and can be coupled with the low pressure spool or a high pressure spool of the second multi-spool gas turbine engine 172, for example. Similarly, the fourth propulsor 170A includes a fourth multi-spool gas turbine engine 172A and a fourth electric machine 174A mechanically coupled thereto. The fourth electric machine 174A can be embedded within the engine core of the fourth multi-spool gas turbine engine 172A and can be coupled with a low pressure spool or a high pressure spool of the fourth multi-spool gas turbine engine 172A.

In such embodiments, upon receiving the power command 310 indicating that the multi-spool gas turbine engines 162, 172, 162A, 172A are to operate in idle condition, the one or more processors of the computing system 190 are configured to cause the third multi-spool gas turbine engine 162A to drive the third electric machine 164A so that the third electric machine 164A generates electrical power. In this regard, the third electric machine 164A is controlled to operate in a generator mode. Further, the one or more processors of the computing system 190 are configured to cause electrical power generated by the third electric machine 164A of the third propulsor 160A to be provided to the first electric machine 164 of the first propulsor 160 so that the first electric machine 164 applies torque to the spool of the first multi-spool gas turbine engine 162 to which the first electric machine 164 is coupled. As depicted in FIG. 5, electrical power, denoted by the arrow EP, is transferred from the third electric machine 164A to the power converter 188A and is directed across one or more electric lines 186 to the power converter 188. The electrical power is then directed to the first electric machine 164. The one or more processors of the computing system 190 can also be configured to reduce the fuel provided to the first multi-spool gas turbine engine 162, e.g., by controlling the fuel delivery system 280 thereof.

Further, upon receiving the power command 310 indicating that the multi-spool gas turbine engines 162, 172, 162A, 172A are to operate in idle condition, the one or more processors of the computing system 190 are configured to cause the fourth multi-spool gas turbine engine 172A to drive the fourth electric machine 174A so that the fourth electric machine 174A generates electrical power. In this manner, the fourth electric machine 174A is controlled to operate in a generator mode. In addition, the one or more processors of the computing system 190 are configured to cause electrical power generated by the fourth electric machine 174A of the fourth propulsor 170A to be provided to the second electric machine 174 of the second propulsor 170 so that the second electric machine 174 applies torque to the spool of the second multi-spool gas turbine engine 172 to which the second electric machine 174 is coupled. As shown in FIG. 5, electrical power, denoted by the arrow EP, is transferred from the fourth electric machine 174A to the power converter 189A and is directed across one or more electric lines 186 to the power converter 189. The electrical power is then directed to the second electric machine 174. The one or more processors of the computing system 190 can also be configured to reduce the fuel provided to the second multi-spool gas turbine engine 172, e.g., by controlling the fuel delivery system 281 thereof.

Notably, under such a control scheme, the electrical power provided to an electric machine generated by another electric machine may only be transferred within a single wing. That is, the electrical power may not be transferred over or through the fuselage to the other wing of the aircraft 100. For instance, the electrical power generated by the third electric machine 164A of the third propulsor 160A can be provided to the first electric machine 164 of the first propulsor 160, both of which are mounted to the first wing 120. Likewise, the electrical power generated by the fourth electric machine 174A of the fourth propulsor 170A can be provided to the second electric machine 174 of the second propulsor 170, both of which are mounted to the second wing 122. As the electrical power is transferred between electric machines mounted to the same wing, the length or number of electric lines required for power distribution may be reduced. This may advantageously reduce the weight of the aircraft 100. Moreover, operating the aircraft 100 in such a manner prevents asymmetric thrust issues and can reduce fuel consumption.

In addition, for the control scheme noted above, the two outer multi-spool gas turbine engines 162, 172 are provided power assists by their respective first and second electric machines 164, 174. However, in other example embodiments, it will be appreciated that the two inner multi-spool gas turbine engines 162A, 172A can be provided power assists by their respective third and fourth electric machines 164A, 174A. The third electric machine 164A can receive electrical power generated by the first electric machine 164 and the fourth electric machine 174A can receive electrical power generated by the second electric machine 174. In such embodiments, the fuel provided to the third multi-spool gas turbine engine 162A can be reduced by controlling a fuel delivery system 280A of the third propulsor 160A and the fuel provided to the fourth multi-spool gas turbine engine 172A can be reduced by controlling a fuel delivery system 281A of the fourth propulsor 170A. In some embodiments, one inner and one outer multi-spool gas turbine engine can be provided a power assist by their respective electric machines.

Figure 6:
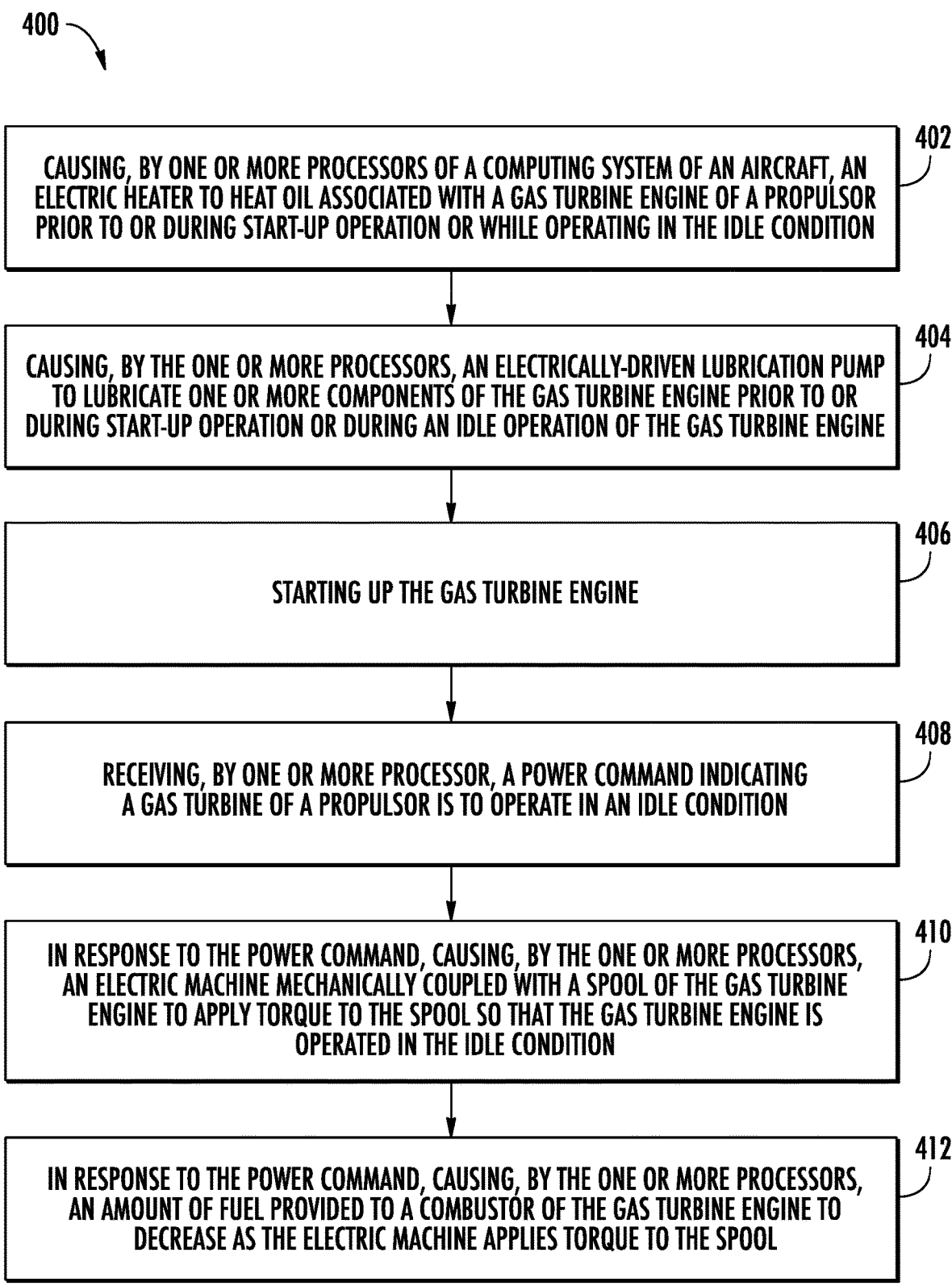
FIG. 6 provides a flow diagram of an exemplary method of operating an aircraft in accordance with exemplary embodiments of the present disclosure.

FIG. 6 provides a flow diagram of an exemplary method (400) of operating an aircraft having a hybrid-electric propulsion system according to one example embodiment of the present disclosure. For instance, the exemplary method (400) may be utilized to operate the aircraft 100 of FIG. 1 or some other aircraft having a hybrid-electric propulsion system. It should be appreciated that the method (400) is discussed herein to describe exemplary aspects of the present subject matter and is not intended to be limiting.

At (402), optionally, the method (400) includes causing, by one or more processors of a computing system of an aircraft, an electric heater to heat oil associated with a gas turbine engine of a propulsor prior to or during start-up operation or while operating in the idle condition. For instance, electrical power can be provided to the electric heater thereby causing the electric heater to emit heat. The electric heater may be positioned in a heat exchange relationship with a volume of oil of the gas turbine engine. Accordingly, the electric heater may heat the oil. Pre-heating the oil associated with the gas turbine engine can reduce engine wear on startup and may improve starting operability. Electrical power can be provided to the electric heater from any suitable source, such as a battery bank, an electric machine mechanically coupled to another gas turbine engine of the aircraft, an electric machine mechanically coupled with an APU, or some other electrical power source.

At (404), optionally, the method (400) includes causing, by the one or more processors, an electrically-driven lubrication pump to lubricate one or more components of the gas turbine engine prior to or during start-up operation or while operating in the idle condition. Pre-lubricating the one or more components of the gas turbine engine, particularly oil heated at (402), can reduce engine wear on startup and may improve starting operability. Any suitable type and number of components can be pre-lubricated, such as bearings and other components that interface or come into contact with other components. The electrically-driven lubrication pump can be mechanically decoupled from the spools of the engine. Thus, the engine need not be turned to pre-lubricate the components of the engine. Electrical power can be provided to electrically-driven lubrication pump from any suitable source, such a battery bank, an electric machine mechanically coupled to another gas turbine engine of the aircraft, an electric machine mechanically coupled with an APU, or some other electrical power source.

At (406), the method (400) includes starting up the gas turbine engine. For instance, the one or more processors of the computing system can cause the gas turbine engine to startup, e.g., by an air start or some other suitable technique. In some implementations, an electric machine mechanically coupled with a spool of the gas turbine engine can provide a power assist to the spool during engine startup. Particularly, electrical power can be provided to electric machine from any suitable source, such as a battery bank, an electric machine mechanically coupled to a gas turbine engine of another propulsor of the aircraft, an electric machine mechanically coupled with an APU, or some other electrical power source. In other implementations, the electric machine is not controlled to power assist the spool of the gas turbine engine during startup.

At (408), the method (400) includes receiving, by one or more processors, a power command indicating a gas turbine engine of a propulsor is to operate in an idle condition. For instance, the power command can be generated based at least in part on an input provided by a pilot or an autopilot system. For example, a pilot can adjust or otherwise manipulate a thrust lever, and based on the TLA, a power command can be generated that indicates that the gas turbine engine of the propulsor is to operate in an idle condition. As another example, an autothrust function generated by an autoflight system of the aircraft can generate the power command indicating the gas turbine engine of the propulsor is to operate in an idle condition. The generated power command can be routed to and received by the one or more processors.

At (410), the method (400) includes, in response to the power command, causing, by the one or more processors, an electric machine mechanically coupled with a low pressure spool of the gas turbine engine to apply torque to the low pressure spool so that the gas turbine engine is operated in the idle condition. In this way, the electric machine can provide a power assist to the gas turbine engine to facilitate meeting the commanded power. Electrical power can be provided to electric machine from any suitable source, such as a battery bank, an electric machine mechanically coupled to a gas turbine engine of another propulsor of the aircraft, an electric machine mechanically coupled with an APU, or some other electrical power source.

At (412), optionally, the method (400) includes, in response to the power command, causing, by the one or more processors, an amount of fuel provided to a combustor of the gas turbine engine to decrease as the electric machine applies torque to the low pressure spool. In this way, fuel consumption can be reduced and the gas turbine engine can still meet to the demanded power, particularly in view of the power assist provided by the electric machine.

In some implementations, the method (400) includes receiving, by the one or more processors, data indicating one or more operating conditions associated with the aircraft. In such implementations, the method (400) additionally includes determining, by the one or more processors, whether the gas turbine engine is operating in a ground idle mode or a flight idle mode based at least in part on the data. In addition, the method (400) further includes providing an amount of fuel to be provided to a combustor of the gas turbine engine and a rate of electrical power to be provided to the electric machine based at least in part on whether the gas turbine engine is operating in the ground idle mode or the flight idle mode. The operating conditions can be sensed, calculated, or provided values. Generally, determining whether the gas turbine engine is operating in a ground idle mode or a flight idle mode can be done in any suitable manner using any suitable logic approach.

For instance, when the one or more processors determine that the gas turbine engine is operating in a flight idle mode, the one or more processors of the computing system can cause an amount of fuel to be provided to the combustor of the gas turbine engine and a rate of electrical power to be provided to the electric machine so that the commanded power is met, but also so that a predetermined margin is present between a present torque output of the electric machine and a maximum rated torque output of the electric machine. In this way, on a subsequent power command in which increased power is commanded, an increased rate of electrical power can be provided to the electric machine to nearly instantaneously increase the torque applied to the spool, which, consequently, nearly instantaneously increases the power output of the gas turbine engine. This may be advantageous during flight, particularly when a missed approach occurs or evasive maneuvers are needed.

When the one or more processors of the computing system determine that the gas turbine engine is operating in a ground idle mode, the one or more processors can cause an amount of fuel to be provided to the combustor of the gas turbine engine and a rate of electrical power to be provided to the electric machine so that the commanded power is met, but also so that the rate of electrical power provided to the electric machine causes the electric machine to be operated at its maximum rated torque output. This may maximize fuel consumption reduction. In other implementations, however, the one or more processors of the computing system can cause an amount of fuel to be provided to the combustor of the gas turbine engine and a rate of electrical power to be provided to the electric machine so that the commanded power is met for the ground idle mode, but also so that a ground predetermined margin is present between a present torque output of the electric machine and a maximum rated torque output of the electric machine. The ground predetermined margin can be less than the predetermined margin associated with the flight idle mode.

In some implementations, the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a low pressure spool of the second multi-spool gas turbine engine, and wherein the method further comprises: causing, by the one or more processors, the second multi-spool gas turbine engine to drive the second electric machine so that the second electric machine generates electrical power. In such implementations, electrical power generated by the second electric machine is provided to the first electric machine so that the first electric machine applies torque to the low pressure spool associated with the first multi-spool gas turbine engine. Further, in such implementations, the one or more processors can cause an amount of fuel provided to a combustor of the first multi-spool gas turbine engine to decrease so that the first multi-spool gas turbine engine and the second multi-spool gas turbine engine produce a same thrust output. This may advantageously create thrust symmetry. Moreover, in such implementations, the amount of fuel provided to the combustor of the first multi-spool gas turbine engine can be adjusted in real time so that that the first multi-spool gas turbine engine and the second multi-spool gas turbine engine produce the same thrust output, e.g., for the duration of a taxi operation.

Further in some implementations, the aircraft includes a fuselage, a first wing extending outward from the fuselage, and a second wing extending outward from the fuselage opposite the first wing, e.g., as shown in FIG. 1. In such implementations, the first propulsor is mounted to the first wing and the second propulsor is mounted to the second wing, e.g., as depicted in FIG. 1. In yet other implementations, the first propulsor and the second propulsor are both mounted to the same wing, such as the first wing or the second wing. FIG. 5 provides an example embodiment in which a wing includes two propulsors mounted thereto.

In yet other implementations, engine control logic can alternate which engine receives the electric machine power assist during idle operation upon each startup. In this way, engine and electric machine wear may occur more evenly over the propulsors. That is, the direction of electrical power transfer can be alternated between flights or some other interval to equalize the wear and runtime between propulsors.

Particularly, in one implementation, the propulsor is a first propulsor, the gas turbine engine is a first multi-spool gas turbine engine, and the electric machine is a first electric machine. The aircraft can further include a second propulsor having a second multi-spool gas turbine engine and a second electric machine mechanically coupled with a spool of the second multi-spool gas turbine engine. In such implementations, the method (400) can include implementing a first control scheme, wherein implementing the first control scheme comprises causing, by the one or more processors, the second multi-spool gas turbine engine to drive the second electric machine so that the second electric machine generates electrical power, and providing electrical power generated by the second electric machine to the first electric machine so that the first electric machine applies torque to the spool associated with the first multi-spool gas turbine engine to operate the first multi-spool gas turbine engine in the idle condition.

Then, upon a predetermined condition being met, (e.g., upon a subsequent startup of the first multi-spool gas turbine engine and the second multi-spool gas turbine engine), the method (400) can include implementing a second control scheme, wherein implementing the second control scheme comprises receiving, by the one or more processors, a second power command indicating the second multi-spool gas turbine engine of the second propulsor is to operate in an idle condition, and in response to the second power command, causing, by the one or more processors, the second electric machine mechanically to apply torque to the spool of the second multi-spool gas turbine engine so that the second multi-spool gas turbine engine is operated in the idle condition, and causing, by the one or more processors, the first multi-spool gas turbine engine to drive the first electric machine so that the first electric machine generates electrical power, and providing electrical power generated by the first electric machine to the second electric machine so that the second electric machine applies torque to the spool associated with the second multi-spool gas turbine engine to operate the second multi-spool gas turbine engine in the idle condition.

Further, the method (400) can include alternating, upon each subsequent instance in which the predetermined condition is met (e.g., upon each subsequent startup of the first multi-spool gas turbine engine and the second multi-spool gas turbine engine), between the first control scheme and the second control scheme. In this way, as noted above, wear and runtime can be more equally distributed to the propulsors. The predetermined condition can be, for example and without limitation, a subsequent startup of the first multi-spool gas turbine engine and the second multi-spool gas turbine engine, a predetermined runtime cycle, one or more wear or health indicators associated with the engines or electric machines, or a subsequent flight or mission. In this regard, the system can alternate between the first and second control schemes, e.g., upon each subsequent startup of the multi-spool gas turbine engines, upon the predetermined runtime cycle elapsing, upon an indication of wear or health imbalance, or upon each subsequent flight, for example.

Figure 7:
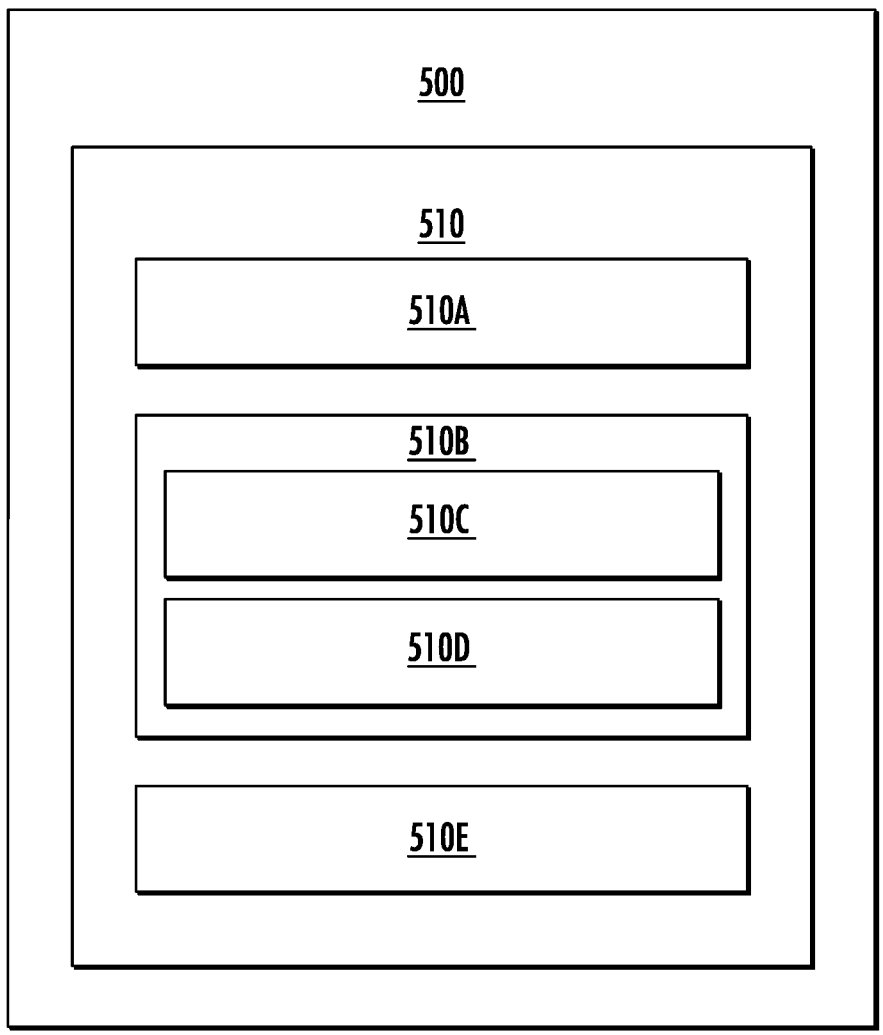
FIG. 7 provides an example computing system according to example embodiments of the present disclosure.

FIG. 7 provides an example computing system 500 according to example embodiments of the present disclosure. The computing system 190 described herein may include various components and perform various functions of the computing system 500 described below, for example.

As shown in FIG. 7, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as controlling idle operations of propulsors of an aircraft. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, lookup tables, databases, etc.

The computing device(s) 510 can also include a network interface 510E used to communicate, for example, with the other components of system 500 (e.g., via a communication network). The network interface 510E can include any suitable components for interfacing with one or more network(s), including for example, transmitters, receivers, ports, controllers, antennas, and/or other suitable components. One or more devices can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A hybrid-electric propulsion system for an aircraft, comprising: a propulsor having a gas turbine engine and an electric machine mechanically coupled with a spool of the gas turbine engine; and a computing system having one or more processors configured to: receive a power command indicating the gas turbine engine is to operate in an idle condition; and in response to the power command, cause electrical power to be provided to the electric machine to cause the electric machine to apply torque to the spool.

2. The hybrid-electric propulsion system of any preceding clause, wherein the one or more processors are further configured to: in response to the power command, cause a reduction in an amount of fuel provided to a combustor of the gas turbine engine.

3. The hybrid-electric propulsion system of any preceding clause, wherein the one or more processors are further configured to: receive data indicating one or more operating conditions associated with the aircraft or hybrid-electric propulsion system; determine whether the gas turbine engine is operating in a ground idle mode or a flight idle mode based at least in part on the data; and cause an amount of fuel to be provided to a combustor of the gas turbine engine and a rate of electrical power to be provided to the electric machine based at least in part on whether the gas turbine engine is operating in the ground idle mode or the flight idle mode.

4. The hybrid-electric propulsion system of any preceding clause, wherein the gas turbine engine has an electrically-driven lubrication pump, and wherein the one or more processors are further configured to: cause the electrically-driven lubrication pump to lubricate one or more components of the gas turbine engine prior to or during start-up operation or while operating in the idle condition.

5. The hybrid-electric propulsion system of any preceding clause, wherein the gas turbine engine has an electric heater, and wherein the one or more processors are further configured to: cause the electric heater to heat oil associated with the gas turbine engine prior to or during start-up operation or while operating in the idle condition.

6. The hybrid-electric propulsion system of any preceding clause, wherein the propulsor is a first propulsor, the gas turbine engine is a first multi-spool gas turbine engine, and the electric machine is a first electric machine, and wherein the hybrid-electric propulsion system further comprises: a second propulsor having a second multi-spool gas turbine engine and a second electric machine mechanically coupled with a spool of the second multi-spool gas turbine engine, and wherein the one or more processors are further configured to: cause the second multi-spool gas turbine engine to drive the second electric machine so that the second electric machine generates electrical power; and cause electrical power generated by the second electric machine to be provided to the first electric machine so that the first electric machine applies torque to the spool associated with the first multi-spool gas turbine engine.

7. The hybrid-electric propulsion system of any preceding clause, wherein the aircraft includes a fuselage, a first wing extending outward from the fuselage, and a second wing extending outward from the fuselage opposite the first wing, and wherein the first propulsor is mounted to the first wing and the second propulsor is mounted to the second wing.

8. The hybrid-electric propulsion system of any preceding clause, wherein the aircraft includes a fuselage, a first wing extending outward from the fuselage, and a second wing extending outward from the fuselage opposite the first wing, and wherein the first propulsor and the second propulsor are mounted to the first wing.

9. The hybrid-electric propulsion system of any preceding clause, further comprising: one or more electric energy storage units, and wherein in causing electrical power to be provided to the electric machine so that the electric machine applies torque to the spool, the one or more processors are further configured to: cause electrical power from the one or more electric energy storage units to be provided to the electric machine so that the electric machine applies torque to the spool.

10. A non-transitory computer readable medium comprising computer-executable instructions, which, when executed by one or more processors of a computing system for an aircraft, cause the one or more processors to: receive a power command indicating a gas turbine engine of a propulsor is to operate in an idle condition; and in response to the power command, cause an electric machine mechanically coupled with a spool of the gas turbine engine to apply torque to the spool to cause the gas turbine engine to operate in the idle condition.

11. The non-transitory computer readable medium of any preceding clause, wherein when the computer-executable instructions are executed by the one or more processors, the one or more processors are caused to: in response to the power command, cause an amount of fuel provided to a combustor of the gas turbine engine to decrease as the electric machine applies torque to the spool.

12. The non-transitory computer readable medium of any preceding clause, wherein when the computer-executable instructions are executed by the one or more processors, the one or more processors are caused to: receive data indicating one or more operating conditions associated with the aircraft; determine whether the gas turbine engine is operating in a ground idle mode or a flight idle mode based at least in part on the data; and cause an amount of fuel to be provided to a combustor of the gas turbine engine and a rate of electrical power to be provided to the electric machine based at least in part on whether the gas turbine engine is operating in the ground idle mode or the flight idle mode.

13. The non-transitory computer readable medium of any preceding clause, wherein the gas turbine engine has an electrically-driven lubrication pump, and wherein when the computer-executable instructions are executed by the one or more processors, the one or more processors are caused to: cause the electrically-driven lubrication pump to lubricate one or more components of the gas turbine engine prior to or during start-up operation or while operating in the idle condition.

14. The non-transitory computer readable medium of any preceding clause, wherein the gas turbine engine has an electric heater, and wherein when the computer-executable instructions are executed by the one or more processors, the one or more processors are caused to: cause the electric heater to heat oil associated with the gas turbine engine prior to or during start-up operation or while operating in the idle condition.

15. The non-transitory computer readable medium of any preceding clause, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein when the computer-executable instructions are executed by the one or more processors, the one or more processors are caused to: cause the second multi-spool gas turbine engine to drive the second electric machine to cause the second electric machine to generate electrical power, and wherein electrical power generated by the second electric machine is provided to the first electric machine to cause the first electric machine to apply torque to the spool associated with the first multi-spool gas turbine engine.

16. The non-transitory computer readable medium of any preceding clause, wherein when the computer-executable instructions are executed by the one or more processors, the one or more processors are caused to: cause an amount of fuel provided to a combustor of the first multi-spool gas turbine engine to decrease so that the first multi-spool gas turbine engine and the second multi-spool gas turbine engine produce a same thrust output.

17. The non-transitory computer readable medium of any preceding clause, wherein the aircraft includes a fuselage, a first wing extending outward from the fuselage, and a second wing extending outward from the fuselage opposite the first wing, and wherein the first propulsor is mounted to the first wing and the second propulsor is mounted to the second wing.

18. The non-transitory computer readable medium of any preceding clause, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein when the computer-executable instructions are executed by the one or more processors, the one or more processors are caused to: implement a first control scheme, wherein in implementing the first control scheme, the one or more processors cause the second multi-spool gas turbine engine to drive the second electric machine to cause the second electric machine to generate electrical power, and cause electrical power generated by the second electric machine to be provided to the first electric machine to cause the first electric machine to apply torque to the spool associated with the first multi-spool gas turbine engine to operate the first multi-spool gas turbine engine in the idle condition; and upon a subsequent startup of the first multi-spool gas turbine engine and the second multi-spool gas turbine engine, implement a second control scheme, wherein in implementing the second control scheme, the one or more processors receive a second power command indicating the second multi-spool gas turbine engine of the second propulsor is to operate in an idle condition, and in response to the second power command, cause the second electric machine to apply torque to the spool of the second multi-spool gas turbine engine to cause the second multi-spool gas turbine engine to operate in the idle condition, and cause the first multi-spool gas turbine engine to drive the first electric machine to cause the first electric machine to generate electrical power, and cause electrical power generated by the first electric machine to be provided to the second electric machine to cause the second electric machine to apply torque to the spool associated with the second multi-spool gas turbine engine to operate the second multi-spool gas turbine engine in the idle condition, and alternate, upon each subsequent startup of the first multi-spool gas turbine engine and the second multi-spool gas turbine engine, between the first control scheme and the second control scheme.

19. An aircraft, comprising: a fuselage; a first wing extending outward from the fuselage; a second wing extending outward from the fuselage opposite the first wing, a first propulsor having a first multi-spool gas turbine engine and a first electric machine mechanically coupled with a spool of the first multi-spool gas turbine engine; a second propulsor having a second multi-spool gas turbine engine and a second electric machine mechanically coupled with a spool of the second multi-spool gas turbine engine, the first propulsor and the second propulsor each being mounted to one of the first wing and the second wing; and one or more processors configured to: cause the second multi-spool gas turbine engine to drive the second electric machine to cause the second electric machine to generate electrical power; and cause electrical power generated by the second electric machine to be provided to the first electric machine to cause the first electric machine to apply torque to the spool of the first multi-spool gas turbine engine.

20. The aircraft of any preceding clause, wherein the first propulsor is mounted to the first wing and the second propulsor is mounted to the second wing or the first propulsor and the second propulsor are both mounted to first wing.

21. A method of operating a hybrid-electric propulsion system of an aircraft, the method comprising: receiving, by one or more processors, a power command indicating a gas turbine engine of a propulsor is to operate in an idle condition; and in response to the power command, causing, by the one or more processors, an electric machine mechanically coupled with a spool of the gas turbine engine to apply torque to the spool to cause the gas turbine engine to operate in the idle condition.

22. The method of any preceding clause, further comprising: in response to the power command, causing, by the one or more processors, an amount of fuel provided to a combustor of the gas turbine engine to decrease as the electric machine applies torque to the spool.

23. The method of any preceding clause, further comprising: receiving, by the one or more processors, data indicating one or more operating conditions associated with the aircraft; determining, by the one or more processors, whether the gas turbine engine is operating in a ground idle mode or a flight idle mode based at least in part on the data; and providing an amount of fuel to be provided to a combustor of the gas turbine engine and a rate of electrical power to be provided to the electric machine based at least in part on whether the gas turbine engine is operating in the ground idle mode or the flight idle mode.

24. The method of any preceding clause, wherein the gas turbine engine has an electrically-driven lubrication pump, and wherein the method further comprises: causing, by the one or more processors, the electrically-driven lubrication pump to lubricate one or more components of the gas turbine engine prior to or during start-up operation or while operating in the idle condition.

25. The method of any preceding clause, wherein the gas turbine engine has an electric heater, and wherein the method further comprises: causing, by the one or more processors, the electric heater to heat oil associated with the gas turbine engine prior to or during start-up operation or while operating in the idle condition.

26. The method of any preceding clause, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein the method further comprises: causing, by the one or more processors, the second multi-spool gas turbine engine to drive the second electric machine to cause the second electric machine to generate electrical power, and wherein electrical power generated by the second electric machine is provided to the first electric machine to cause the first electric machine to apply torque to the spool associated with the first multi-spool gas turbine engine.

27. The method of any preceding clause, further comprising: causing, by the one or more processors, an amount of fuel provided to a combustor of the first multi-spool gas turbine engine to decrease so that the first multi-spool gas turbine engine and the second multi-spool gas turbine engine produce a same thrust output.

28. The method of any preceding clause, wherein the aircraft includes a fuselage, a first wing extending outward from the fuselage, and a second wing extending outward from the fuselage opposite the first wing, and wherein the first propulsor is mounted to the first wing and the second propulsor is mounted to the second wing.

29. The method of any preceding clause, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein the method further comprises: implementing a first control scheme, wherein implementing the first control scheme comprises causing, by the one or more processors, the second multi-spool gas turbine engine to drive the second electric machine to cause the second electric machine to generate electrical power, and providing electrical power generated by the second electric machine to the first electric machine to cause the first electric machine to apply torque to the spool associated with the first multi-spool gas turbine engine to operate the first multi-spool gas turbine engine in the idle condition; and upon a subsequent startup of the first multi-spool gas turbine engine and the second multi-spool gas turbine engine, implementing a second control scheme, wherein implementing the second control scheme comprises receiving, by the one or more processors, a second power command indicating the second multi-spool gas turbine engine of the second propulsor is to operate in an idle condition, and in response to the second power command, causing, by the one or more processors, the second electric machine to apply torque to the spool of the second multi-spool gas turbine engine to cause the second multi-spool gas turbine engine to operate in the idle condition, and causing, by the one or more processors, the first multi-spool gas turbine engine to drive the first electric machine to cause the first electric machine to generate electrical power, and providing electrical power generated by the first electric machine to the second electric machine to cause the second electric machine to apply torque to the spool associated with the second multi-spool gas turbine engine to operate the second multi-spool gas turbine engine in the idle condition, and alternating, upon each subsequent startup of the first multi-spool gas turbine engine and the second multi-spool gas turbine engine, between the first control scheme and the second control scheme.

What is claimed is:

1. A hybrid-electric propulsion system for an aircraft, comprising:
    a propulsor having a gas turbine engine and an electric machine mechanically coupled with a spool of the gas turbine engine; and
    a computing system having one or more processors configured to:
    receive a power command indicating the gas turbine engine is to operate in an idle condition; and
    in response to the power command, cause electrical power to be provided to the electric machine to cause the electric machine to apply torque to the spool;
    receive data indicating one or more operating conditions associated with the aircraft or hybrid-electric propulsion system;
    determine whether the gas turbine engine is operating in a ground idle mode or a flight idle mode based at least in part on the data; and
    cause an amount of fuel to be provided to a combustor of the gas turbine engine and a rate of electrical power to be provided to the electric machine based at least in part on whether the gas turbine engine is operating in the ground idle mode or the flight idle mode so that a predetermined margin is present between the torque applied to the spool by the electric machine and a maximum torque output of the electric machine wherein the predetermined margin of the flight idle mode is different than the predetermined margin of the ground idle mode.

2. The hybrid-electric propulsion system of claim 1, wherein the one or more processors are further configured to:
    in response to the power command, cause a reduction in the amount of fuel provided to the combustor of the gas turbine engine.

3. The hybrid-electric propulsion system of claim 1, wherein the gas turbine engine has an electrically-driven lubrication pump, and wherein the one or more processors are further configured to:
    cause the electrically-driven lubrication pump to lubricate one or more components of the gas turbine engine prior to or during start-up operation or while operating in the idle condition.

4. The hybrid-electric propulsion system of claim 1, wherein the gas turbine engine has an electric heater, and wherein the one or more processors are further configured to:
    cause the electric heater to heat oil associated with the gas turbine engine prior to or during start-up operation or while operating in the idle condition.

5. The hybrid-electric propulsion system of claim 1, wherein the propulsor is a first propulsor, the gas turbine engine is a first multi-spool gas turbine engine, and the electric machine is a first electric machine, and wherein the hybrid-electric propulsion system further comprises:
    a second propulsor having a second multi-spool gas turbine engine and a second electric machine mechanically coupled with a spool of the second multi-spool gas turbine engine, and
    wherein the one or more processors are further configured to:
        cause the second multi-spool gas turbine engine to drive the second electric machine so that the second electric machine generates electrical power; and
        cause electrical power generated by the second electric machine to be provided to the first electric machine so that the first electric machine applies torque to the spool associated with the first multi-spool gas turbine engine.

6. The hybrid-electric propulsion system of claim 5, wherein the aircraft includes a fuselage, a first wing extending outward from the fuselage, and a second wing extending outward from the fuselage opposite the first wing, and wherein the first propulsor is mounted to the first wing and the second propulsor is mounted to the second wing.

7. The hybrid-electric propulsion system of claim 5, wherein the aircraft includes a fuselage, a first wing extending outward from the fuselage, and a second wing extending outward from the fuselage opposite the first wing, and wherein the first propulsor and the second propulsor are mounted to the first wing.

8. The hybrid-electric propulsion system of claim 1, further comprising:
    one or more electric energy storage units, and
        wherein in causing electrical power to be provided to the electric machine so that the electric machine applies torque to the spool, the one or more processors are further configured to:
        cause electrical power from the one or more electric energy storage units to be provided to the electric machine so that the electric machine applies torque to the spool.

9. A non-transitory computer readable medium comprising computer-executable instructions, which, when executed by one or more processors of a computing system for an aircraft, cause the one or more processors to:
    receive a power command indicating a gas turbine engine of a propulsor is to operate in an idle condition;
    in response to the power command, cause an electric machine mechanically coupled with a spool of the gas turbine engine to apply torque to the spool to cause the gas turbine engine to operate in the idle condition so that a predetermined margin is present between the torque applied to the spool by the electric machine and a maximum torque output of the electric machine;
    receive data indicating one or more operating conditions associated with the aircraft;
    determine whether the gas turbine engine is operating in a ground idle mode or a flight idle mode based at least in part on the data; and
    cause an amount of fuel to be provided to a combustor of the gas turbine engine and a rate of electrical power to be provided to the electric machine based at least in part on whether the gas turbine engine is operating in the ground idle mode or the flight idle mode
    wherein the predetermined margin of the flight idle mode is different than the predetermined margin of the ground idle mode.

10. The non-transitory computer readable medium of claim 9, wherein when the computer-executable instructions are executed by the one or more processors, the one or more processors are caused to:

in response to the power command, cause the amount of fuel provided to the combustor of the gas turbine engine to decrease as the electric machine applies torque to the spool.

11. The non-transitory computer readable medium of claim 9, wherein the gas turbine engine has an electrically-driven lubrication pump, and wherein when the computer-executable instructions are executed by the one or more processors, the one or more processors are caused to:

cause the electrically-driven lubrication pump to lubricate one or more components of the gas turbine engine prior to or during start-up operation or while operating in the idle condition.

12. The non-transitory computer readable medium of claim 9, wherein the gas turbine engine has an electric heater, and wherein when the computer-executable instructions are executed by the one or more processors, the one or more processors are caused to:

cause the electric heater to heat oil associated with the gas turbine engine prior to or during start-up operation or while operating in the idle condition.

13. The non-transitory computer readable medium of claim 9, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein when the computer-executable instructions are executed by the one or more processors, the one or more processors are caused to:

cause the second multi-spool gas turbine engine to drive the second electric machine to cause the second electric machine to generate electrical power, and wherein electrical power generated by the second electric machine is provided to the first electric machine to cause the first electric machine to apply torque to the spool associated with the first multi-spool gas turbine engine.

14. The non-transitory computer readable medium of claim 13, wherein when the computer-executable instructions are executed by the one or more processors, the one or more processors are caused to:

cause an amount of fuel provided to a combustor of the first multi-spool gas turbine engine to decrease so that the first multi-spool gas turbine engine and the second multi-spool gas turbine engine produce a same thrust output.

15. The non-transitory computer readable medium of claim 13, wherein the aircraft includes a fuselage, a first wing extending outward from the fuselage, and a second wing extending outward from the fuselage opposite the first wing, and wherein the first propulsor is mounted to the first wing and the second propulsor is mounted to the second wing.

16. The non-transitory computer readable medium of claim 9, wherein the propulsor is a first propulsor, the gas turbine engine is a first multi-spool gas turbine engine, and the electric machine is a first electric machine, and wherein the aircraft further includes a second propulsor having a second multi-spool gas turbine engine and a second electric machine mechanically coupled with a spool of the second multi-spool gas turbine engine, and wherein when the computer-executable instructions are executed by the one or more processors, the one or more processors are caused to:

implement a first control scheme, wherein in implementing the first control scheme, the one or more processors cause the second multi-spool gas turbine engine to drive the second electric machine to cause the second electric machine to generate electrical power, and cause electrical power generated by the second electric machine to be provided to the first electric machine to cause the first electric machine to apply torque to the spool associated with the first multi-spool gas turbine engine to operate the first multi-spool gas turbine engine in the idle condition; and upon a subsequent startup of the first multi-spool gas turbine engine and the second multi-spool gas turbine engine, implement a second control scheme, wherein in implementing the second control scheme, the one or more processors receive a second power command indicating the second multi-spool gas turbine engine of the second propulsor is to operate in an idle condition, and in response to the second power command, cause the second electric machine to apply torque to the spool of the second multi-spool gas turbine engine to cause the second multi-spool gas turbine engine to operate in the idle condition, and cause the first multi-spool gas turbine engine to drive the first electric machine to cause the first electric machine to generate electrical power, and cause electrical power generated by the first electric machine to be provided to the second electric machine to cause the second electric machine to apply torque to the spool associated with the second multi-spool gas turbine engine to operate the second multi-spool gas turbine engine in the idle condition, and alternate, upon each subsequent startup of the first multi-spool gas turbine engine and the second multi-spool gas turbine engine, between the first control scheme and the second control scheme.

17. An aircraft, comprising:

a fuselage;

a first wing extending outward from the fuselage;

a second wing extending outward from the fuselage opposite the first wing, a first propulsor having a first multi-spool gas turbine engine and a first electric machine mechanically coupled with a spool of the first multi-spool gas turbine engine;

a second propulsor having a second multi-spool gas turbine engine and a second electric machine mechanically coupled with a spool of the second multi-spool gas turbine engine, the first propulsor and the second propulsor each being mounted to one of the first wing and the second wing;

one or more processors configured to:

cause the second multi-spool gas turbine engine to drive the second electric machine to cause the second electric machine to generate electrical power; and cause electrical power generated by the second electric machine to be provided to the first electric machine at an idle condition of the first propulsor to cause the first electric machine to apply torque to the spool of the first multi-spool gas turbine engine so that a predetermined margin is present between the torque applied to the spool by the electric machine and a maximum torque output of the electric machine;

receive data indicating one or more operating conditions associated with the aircraft;

determine whether the gas turbine engine is operating in a ground idle mode or a flight idle mode based at least in part on the data; and cause an amount of fuel to be provided to a combustor of the gas turbine engine and a rate of electrical power to be provided to the electric machine based at least in part on whether the gas turbine engine is operating in the ground idle mode or the flight idle mode wherein the predetermined margin of the flight idle mode is different than the predetermined margin of the ground idle mode.

18. The aircraft of claim 17, wherein the first propulsor is mounted to the first wing and the second propulsor is mounted to the second wing or the first propulsor and the second propulsor are both mounted to first wing.

* * * * *